Aug. 17, 1965   C. LEAVELL   3,200,893
VIBRATION ELIMINATION
Filed April 9, 1962   13 Sheets-Sheet 4
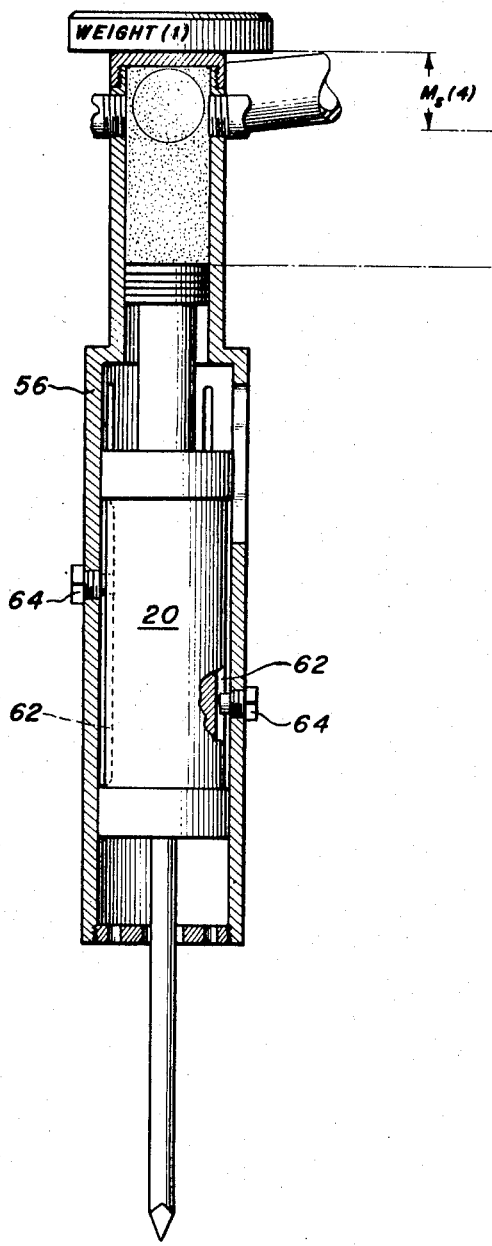
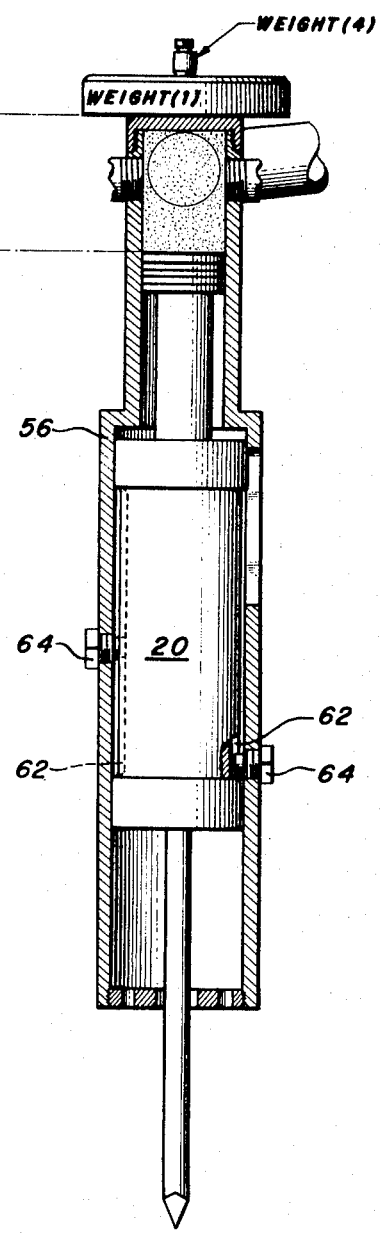

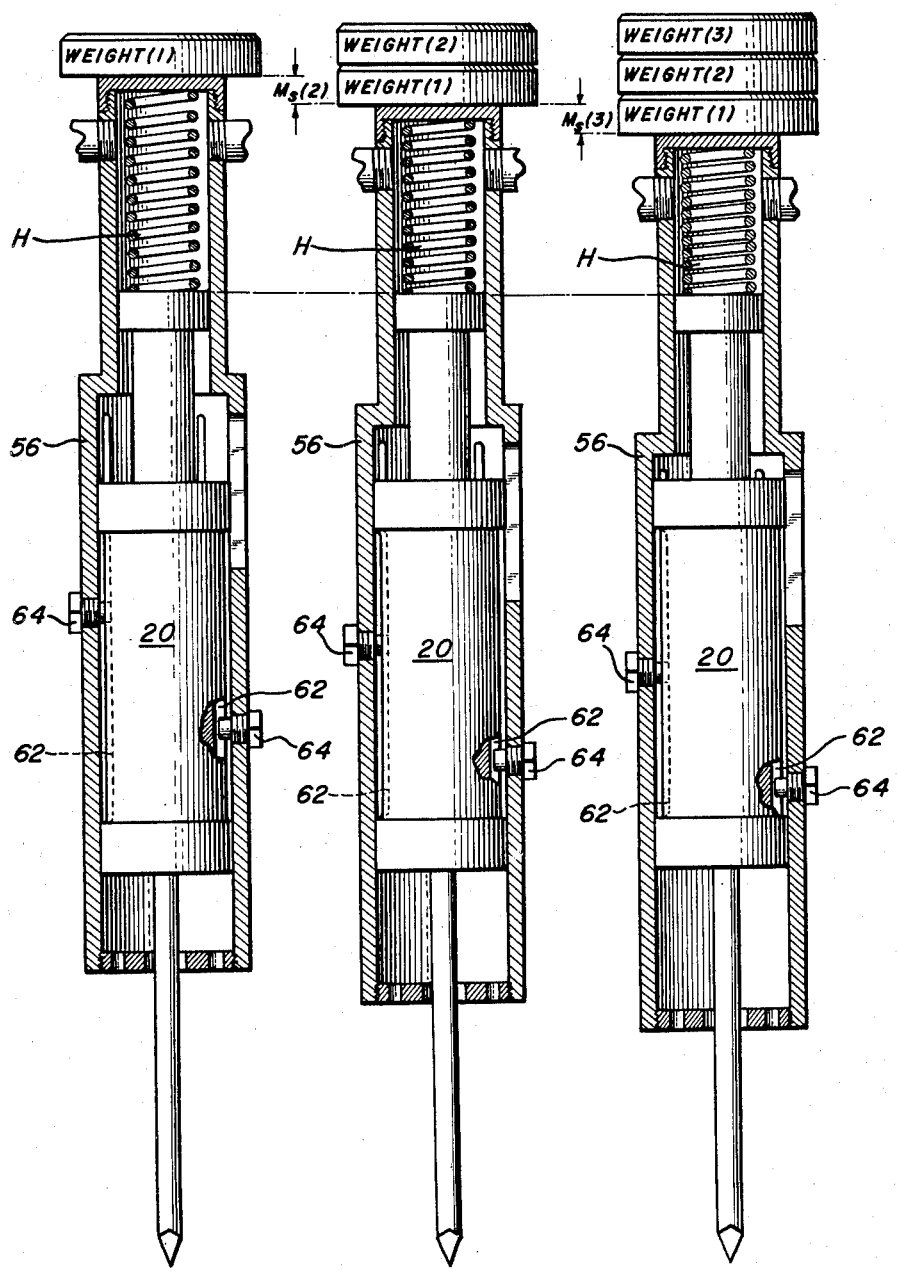

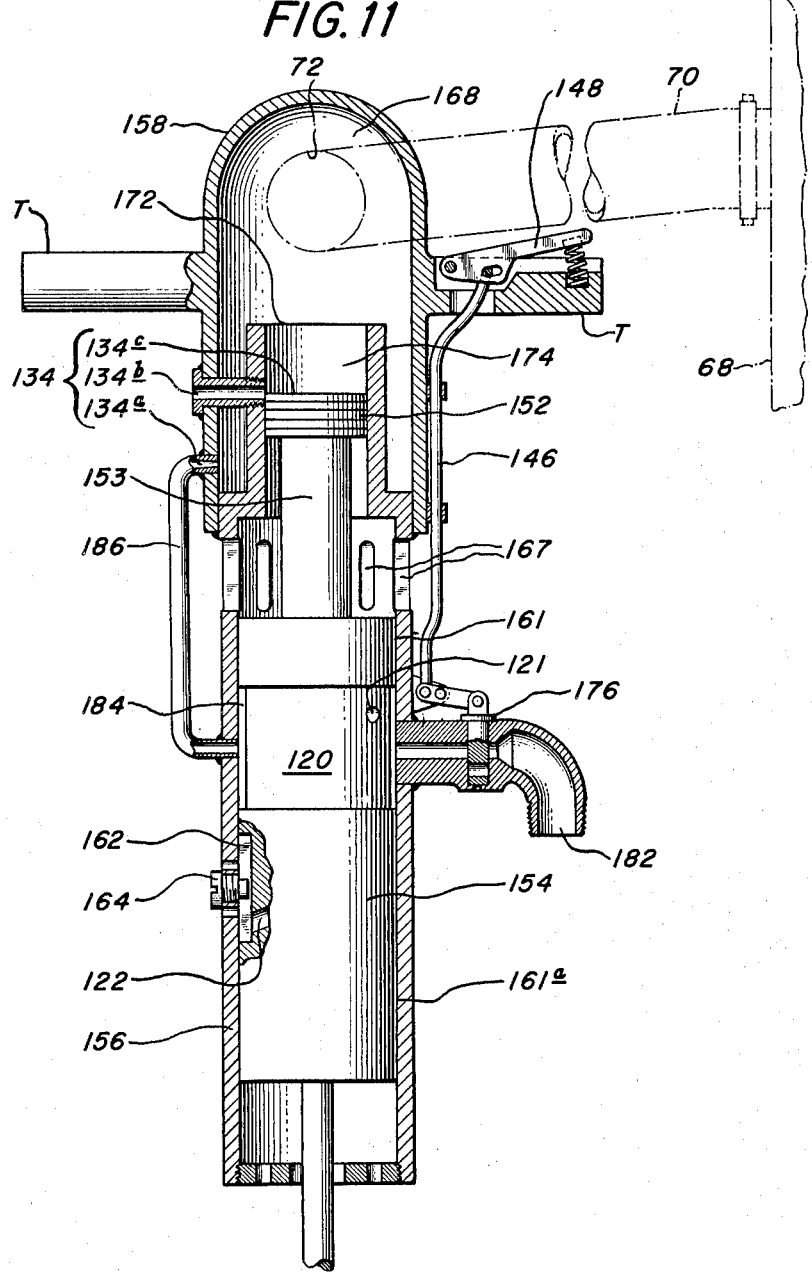

Aug. 17, 1965 C. LEAVELL 3,200,893
VIBRATION ELIMINATION

Filed April 9, 1962 13 Sheets-Sheet 6

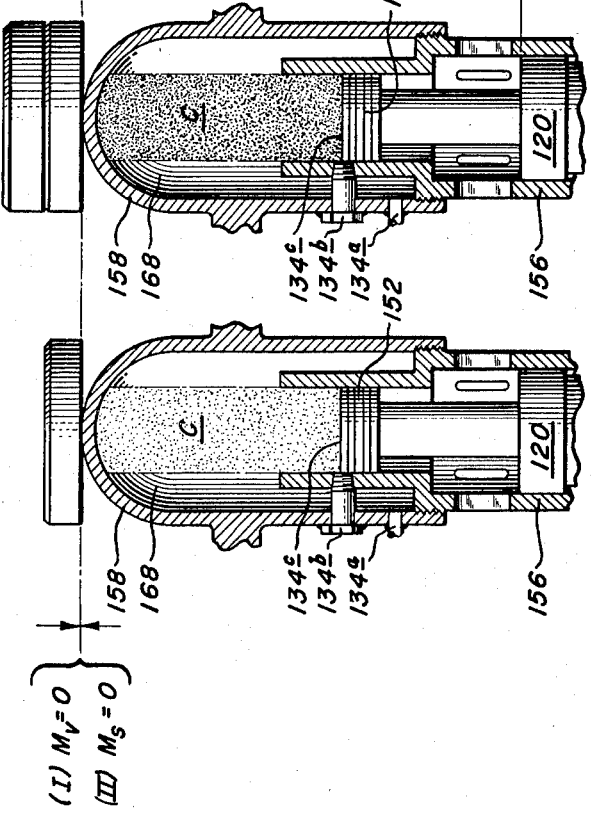

Aug. 17, 1965
C. LEAVELL
3,200,893
VIBRATION ELIMINATION
Filed April 9, 1962
13 Sheets-Sheet 8
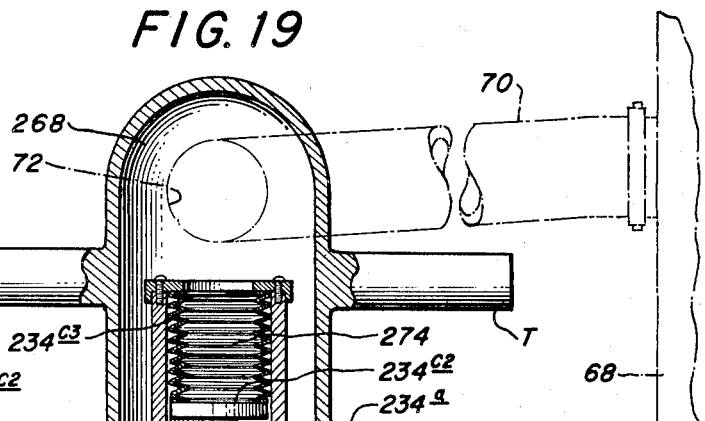
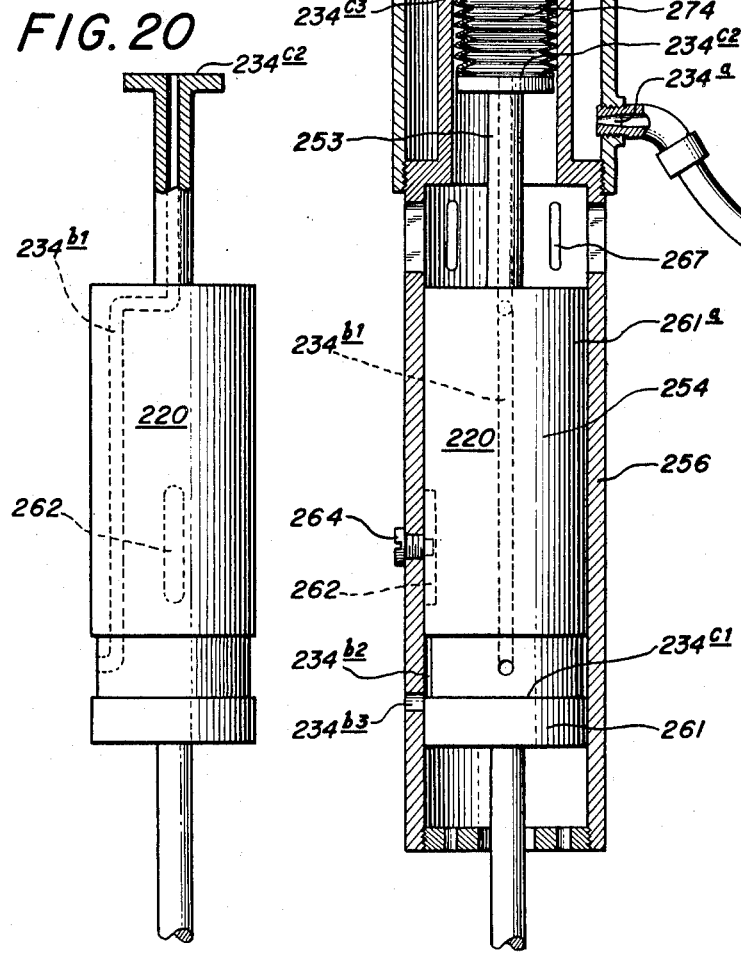

Aug. 17, 1965　　　C. LEAVELL　　　3,200,893
VIBRATION ELIMINATION
Filed April 9, 1962　　　　　　　　　　13 Sheets-Sheet 9

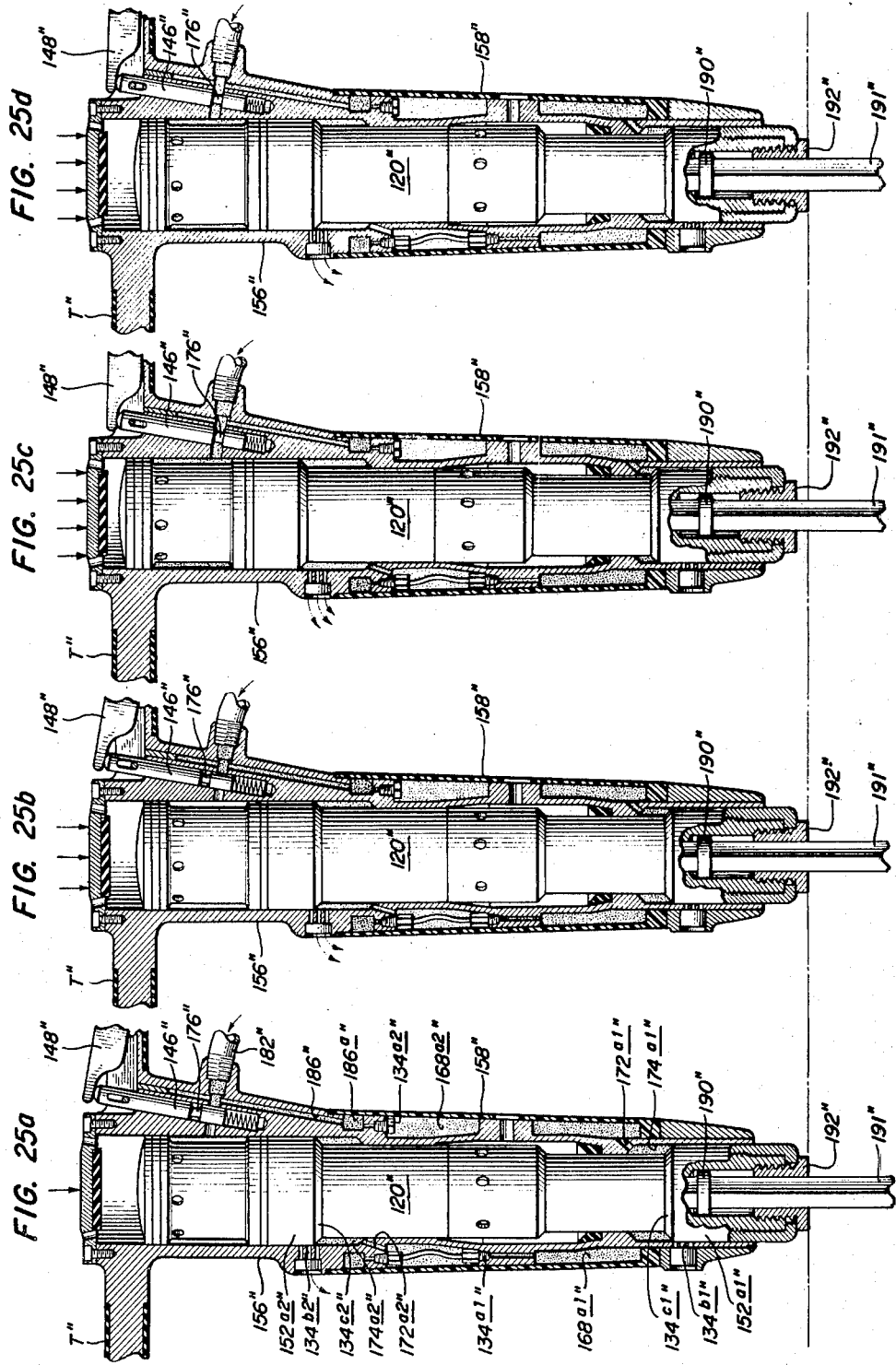

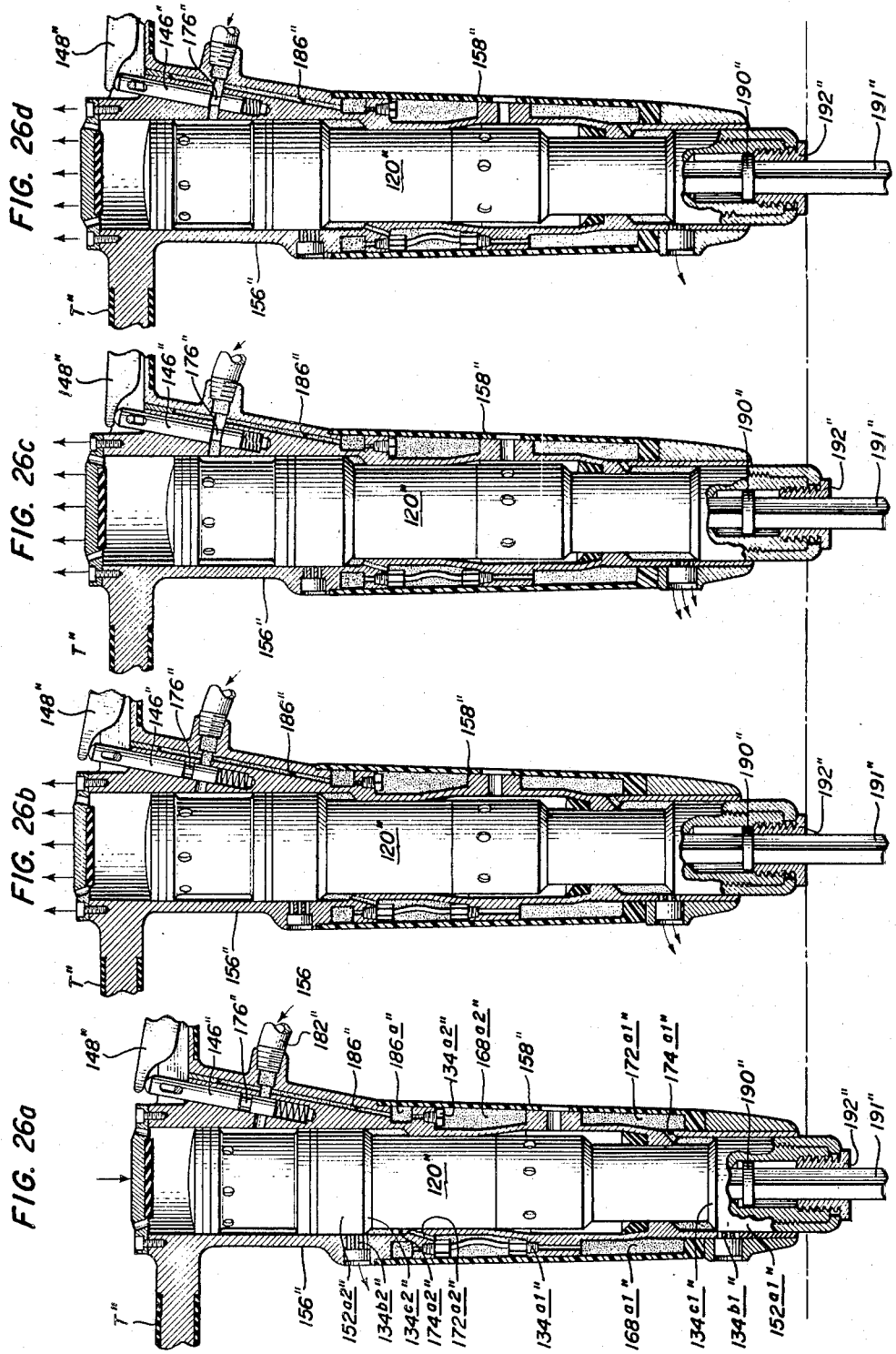

3,200,893
VIBRATION ELIMINATION
Charles Leavell, 206 S. Fairfield Ave., Lombard, Ill.
Filed Apr. 9, 1962, Ser. No. 186,198
45 Claims. (Cl. 173—135)

This invention is concerned with the elimination of vibration and it has utility in application to a variety of vibrating structures such as percussive tools, automobile bodies, flywheel and other rotor supports, supports for machines generating yet more complex vibrations, and automobile and other drive shafts actuated by non-uniform torque.

As is set forth and explained in detail in my copending patent application, Serial No. 742,878, filed June 18, 1959, issued April 10, 1962, as U.S. Patent No. 3,028,841, of which this application is a continuation-in-part, the greater part of antivibration research may be said to pertain to the wide variety of commercial mechanical compositions respectively exemplifying the basic tripartite vibratile structure therein defined as consisting essentially of the combination of (1) a desirably or unavoidably vibrating body, (2) a second body in which the occurrence of vibration is objectionable, and (3) connecting structure accomplishing a necessary transmission of force between the two bodies; and, in terms of these particular elements of such combination may then more specifically be said to pertain to the problems of maintaining the necessary transmission of force between the two bodies through such connecting structure and, at the same time, minimizing the communication of vibration therethrough, from the desirably or unavoidably vibrating body to such second body.

This copending application particularly discloses a second definitive innovation in such a force-transmitting connecting or linkage component (3) suitable for inclusion in a tripartite vibratile composition of the aforesaid type whereby a factor of completely automatic and continuous operativeness is advantageously imposed upon a critically important factor of control over the positional relation of the relatively moving parts of such improved force-transmitting linkage component (3), which also comprises the primary definitive vibration-eliminating or vibration-isolating innovation originally described in U.S. Patent No. 2,400,650, issued May 21, 1946, to Leavell and Wheeler, and therein disclosed in such a tripartite vibratile composition as consisting in a combinative specialization of certain elements of the force-transmitting linkage component (3) thereof investing it with the revolutionary operational characteristic, subject however to the continuous operativeness of such a factor of control shown as accomplished manually over the positional relationship of its parts, of its being inherently incapable of transmitting appreciable vibration from the desirably or unavoidably vibrating component (1) thereof to the component (2) thereof in which the occurrence of vibration is objectionable while performing the necessary function of transmitting force between such two components (1) and (2).

It will, then, be readily understood, with respect to the disclosure in my said copending application of such second definitive innovation whereby such automatic continuous operativeness is imposed upon such factor of positional control, that the state of the anti-vibration art has in consequence been advanced to the point of affording an improved form of such a force-transmitting linkage component (3) which *combines such second innovation providing automatic continuous positional control with such earlier primary innovation establishing the elimination or isolation of vibration conjointly with the transmission of force*, and with, therefore, *by thus avoiding the restriction upon the wide applicability of such conjoint functions heretofore defined by their continuous realization being conditionally referenced to a manually maintained continuity in the operativeness of such positional control*, can now be utilized to provide the useful combination of force transmission with substantially complete vibration elimination or isolation in a greatly increased diversity of commonly known and projected types of commercial mechanical compositions respectively exemplifying the aforesaid basic tripartite vibratile structure.

And whereas, as has been made evident in these explanations, my said Patent No. 2,400,650 disclosed a primary innovation which advanced the available degree of achievement of the generally attempted minimization of the vibration communicated from component (1) to component (2) through component (3) of any mechanical composition or machine generally classifiable as of such tripartite vibratile type, and also coming within a specific manual control limitation upon its functional specialization and applications, to the point of closely approximating the complete *elimination of such vibration* in such component (2) of such tripartite vibratile composition or machine; and whereas, as has also been made evident herein, my said copending application Serial No. 742,878 discloses a second innovation which relatedly pertains to any mechanical composition or machine so classifiable as of tripartite vibratile type and incorporating such primary innovation to so maintain such a component (2) thereof in a substantially vibrationless condition, and which, being effective to remove such manual control limitation, *greatly increases the diversity of application* of such tripartite vibratile compositions and machines comprising such a vibrationless or substantially vibrationless component (2); it is now the continuing purpose of my present invention, by providing additional improvements in such a tripartite vibratile structure comprising a vibrationless or substantially vibrationless component, including a specific improvement permitting the occurrence of selective or random reversals of the direction of action thereupon of the aforesaid necessary force transmitted thereto or therefrom without any associated deterioration of the prevention of the communication of vibration thereto, *to still further increase the range of useful application* of such tripartite vibratile compositions and machines comprising such a vibrationless or substantially vibrationless component.

It will be pertinent here to cite, as one exemplary indication of such application-widening utility of this "double-acting" improvement, the particular tripartite vibratile composition comprised by a railroad car continually receiving vibratory disturbances in rolling over irregularities in the track, and incorporating the wheels, the body, and the suspension system of the car as being, respectively, the unavoidably vibrating component (1), the component (2), in which the occurrence of vibration is objectionable, and the force-transmitting linkage component (3) thereof, in which vibratile composition the eliminative treatment of the predominate transverse horizontal component of the vibratory motion ordinarily communicated to the car body, from the wheels, conjointly with the necessary force transmitted therebetween, through the suspension system, to maintain the body in its mean design position relative to the wheels, must be accomplished in association with random reversals of the direction of the action upon the body of the transverse horizontal component of such position-maintaining force resulting from the required opposite and counterbalancing responsiveness of such horizontal component thereof to the randomly reversing total transverse horizontal loading component tending to displace the body horizontally from such mean relative position and imposed thereupon by wind forces generally applied to the body and/or centrifugal forces applied thereto on track turns and/or gravitational forces applied thereto on transversely sloping sections of track.

And whereas, in continuing reference to the innovative tripartite composition or machine comprising a vibrationless component related to a vibrating component for the necessary transmission of force therebetween through a linkage component operating simultaneously to eliminate the communication of the vibratory motion of such vibrating component to such vibrationless component, my aforesaid patent disclosed and exemplified a manually controlled form of such eliminative action in application to the technologically severe and commercially important specific instance of such vibratory motion exhibited by the piston-actuating cylinder structure of a pneumatic percussive tool, and my aforesaid copending patent application discloses and exemplifies an improved automatically controlled form of such eliminative action in application to the yet more severe vibratory motion of an oscillator mass derived in the prevention thereby of such vibratory motion of the piston-actuating cylinder structure of a pneumatic percussive tool, and whereas, in consequence, both my said patent and copending patent application disclose and exemplify such generally valuable tripartite vibratile composition comprising a vibrationless component in the specifically utilitarian form of improved power-actuated vibratile percussive tool structures respectively comprising external vibrationless components equipped with handles, I shall likewise, in describing my present invention incorporating further improvements in such tripartite vibratile compositions each comprising a vibrationless component, disclose and exemplify the same in the specifically useful form of improved power-actuated vibratile percussive tools each providing a vibrationless external handle-equipped component for affording an entirely comfortable and healthful operational experience to the work handling any such tool. More particularly, the exemplary disclosures herein of such further improved power-actuated percussive tools comprising vibrationless external parts, which may conveniently be referred to as vibrationless percussive tools or simply as vibrationless tools, will include and emphasize descriptions of improvements in power-actuated percussive tools, considered as embracing paving breakers, rock drills, backfill tampers, riveting hammers and the like, of a particular structurally specialized class, previously known for many decades in the prior art and again exemplified in the percussive tools of my aforesaid patent issued in 1946, which, for the purposes hereof, will be referred to as "2-casing percussive tools," or more briefly as "2-casing tools," and which during the prior art history have been successfully devised in some instances to reduce or partially isolate but not eliminate during normal operation the longitudinally-directed external casing vibration generally characteristic of percussive tools of the various functional types thus indicated, and in the innovative instances disclosed in my said patent to substantially eliminate such external casing vibration during a special mode of normal operation which, however, imposes a somewhat inconvenient additional requirement of manual coordination upon the worker.

This structurally specialized class of power-actuated percussive tools, referred to as 2-casing tools, is exemplified by (I) any such tool which comprises, in combination with a casing without handles that vibrates longitudinally during intervals of percussive operation along the axis of reciprocation of a power-actuated blow-striking element contained therein or otherwise carried thereby, an additional casing or casing part, either provided with handles or specialized surfaces for convenient manual seizure or with corresponding attachment means adapted to being mechanically gripped by a holding machine and either entirely or partially enclosing or superjacently abutting such vibratory casing, and designed with respect thereto for relative reciprocatory motion therewith so as to permit the longitudinal vibratory motions of such enclosed or abutted vibratory casing to occur freely within or with respect to such additional casing or casing part, with the object, which is recurrently stated in the prior art, of preventing transmission of the full amplitude of the vibratory motion of such enclosed or abutted casing to such additional casing or casing part.

And this structurally specialized class of power-actuated percussive tools referred to as 2-casing tools may be exemplified more specifically by (II) any such tool of any specific functional type which is adapted to be hand-held and comprises, in combination with a casing without handles that vibrates longitudinally during intervals of percussive operation along the axis of reciprocation of a power-actuated blow-striking element contained therein, a handle-equipped additional casing at least partially enclosing such vibratory casing and related thereto for limited relative reciprocatory motion therewith over a range sufficient to permit the longitudinal vibratory motions of such enclosed or inner casing to occur freely within such handle-equipped additional or outer casing, with the object of preventing transmission thereto of the full amplitude of vibration of such inner casing.

Furthermore, this structurally specialized class of power-actuated percussive tools referred to as 2-casing tools may be yet more specifically exemplified by (III) a hand-held pneumatic paving breaker comprising, in combination with an inner casing without handles that vibrates longitudinally during intervals of percussive operation along the axis of reciprocation of a pneumatically-actuated free-piston blow-striking element contained therein, a handle-equipped outer casing which provides substantially complete enclosure for such vibratory inner casing and is related thereto for limited relative reciprocatory motion therewith over a range sufficient to permit the longitudinal vibratory motions of the inner casing to occur freely within the handle-equipped outer casing with the object of preventing transmission thereto of the full amplitude of vibration of the inner casing.

The improved vibration-eliminating or -isolating invention which is the subject matter hereof is applicable to 2-casing percussive tools generally, and may be adequately disclosed and described in relation to any one of the exemplifying 2-casing percussive tool compositions (I), (II), and (III) hereinabove successively described with increasing degrees of particularity; and it will be understood, therefore, that the subject invention does not indispensably although in certain instances it may advantageously relate to the method of holding the tool whether by hand or by mechanical means, or to the method employed for actuating the blow-striking element whether pneumatic or otherwise, or to the degree of enclosure of the vibratory casing containing the blow-striking element by the additional casing which may be, but is not necessarily, equipped with handles. This statement will serve to focus attention upon the characteristic fundamental composition of and definitive advance beyond prior art 2-casing tools contributed by the subject invention, which will be seen as the specification proceeds to be directed broadly to a novel improved relationship between the vibratory casing containing the blow-striking element and such additional casing, whereby (a) substantially no vibration is transmitted to such additional casing from such vibratory casing during normal operation of any improved 2-casing tool incorporating such novel relationship, and whereby (b) the necessity of inconveniently specializing the mode of such normal operation in order to obtain this desirable result (a) has been eliminated.

For the convenience of more specific description, the discussion of the subject invention will hereinafter be referenced principally to improved and prior art 2-casing percussive tools considered with the same respective degrees of particularity with which the exemplifying prior art 2-casing tool compositions (II) and (III) have been described; and accordingly, as concerns any such prior art or improved 2-casing structure so considered, the vibratory casing containing the blow-striking element will be generally referred to as the "vibratory inner casing" or simply as the "inner casing" of such 2-casing structure in contradistinction to the additional casing element designed with respect thereto for relative reciprocatory motion therewith which will be correspondingly referred to as the "handle-equipped outer casing" or simply as the "outer casing" of such 2-casing structure. However, it will be observed as the specification proceeds that the more basic statements made in these terms as between the outer and inner casing of any 2-casing tool compositions thus conveniently considered with the same respective degrees of particularity as such compositions (II) and (III) have application also as between the hand- or machine-held outer or superjacently abutting casing and the vibratory inner or abutted casing of the very generally described 2-casing composition (I); and it will be understood, therefore, that useful application of my invention extends to all 2-casing tool compositions classifiable as more particular instances of this very generally described composition (I), which more particular instances include but are not limited to such compositions (II) and (III). Correspondingly, still directing attention to any 2-casing percussive tool hereinafter considered with the same degree of particularity as either one of such compositions (II) and (III), the inner longitudinally or axially vibrating casing thereof together with the blow-striking element and other operative parts housed thereby will be referred to as the "vibratory inner percussive tool structure" or simply as the "inner percussive tool structure" of such 2-casing tool without, however, implying limitation of the applicability of my invention only to power-actuated tools coming within the more particular descriptions of such compositions (II) and (III).

Continuing to consider any prior art or improved 2-casing percussive tool, and commencing to describe and discuss the same in more complete detail at the level of particularity of composition (II), it will consist generally of a hand-held power-actuated 2-casing percussive tool of a specific functional type having a longitudinally vibratory inner percussive tool structure which comprises a co-directionally reciprocatory blow-striking element and which may be identical with a conventional or non-conventional 1-casing vibratory hand-held power-actuated percussive tool of the same functional type except for not being equipped with handles and subject in either case to the requirement of being adapted for relative longitudinally reciprocatory cooperation with the handle-equipped outer casing of such 2-casing percussive tool, as by comprising an exterior surface designed for accomplishing such reciprocatory cooperation in slidable relation with a suitable interior surface defined by such outer casing. Evidently, then, the vibratory inner percussive tool structure of such 2-casing tool may be, with respect to internal mechanical composition and operational characteristics, generally equivalent to any 1-casing vibratory hand-held power-actuated percussive tool of that specfic functional type.

It will therefore facilitate consideration of the advances beyond prior art percussive tools, and more particularly of such advances pertaining to 2-casing percussive tools, which can be obtained through practical utilizations of the subject invention to describe in essential terms, applicable to any such 1-casing vibratory hand-held power-actuated percussive tool, the composition, operating cycle, and conditions of use thereof. Necessarily limiting this description to basic details, the structure of such a 1-casing vibratory hand-held power-actuated percussive tool includes a casing adapted to be hand-held as by the extension of one or of two handles therefrom and a hammer or piston element reciprocable therein, and may include also an impact-delivering steel spike or work member carried by the casing for limited movements relative thereto along or in the direction of the axis of reciprocation of such hammer or piston element and adapted to usefully deliver, toward and to a work object usually located externally of the tool, a high-valued axially-directed demolition, forming, or actuating force which is produced by very rapid impact deceleration of such element and which is received by the work member, usually through an anvil or tappet element interposed therebetween, during a very brief interval of percussive engagement occuring once during each reciprocatory cycle of such hammered or piston element.

Further considering such a 1-casing vibratory hand-held power-actuated percussive tool, the hammer or piston element thereof is reciprocated by the alternate application of oppositely-directed accelerating forces thereto which successively propel the hammer or piston element in directions respectively toward and away from the work object; and in consequence of the development and delivery to the mass of the casing, simultaneously with the reversing force thus propelling the hammer through its reciprocatory motion, of a continuously oppositely-directed reaction force which is therefore likewise a reversing force, the casing is accelerated in successively reversed directions or vibrated, along the axis of reciprocation of the hammer or piston element. The axial or longitudinal vibration thus typically developed in the casing structure by the described reaction force produced in association with the reversing force which actuates the hammer or piston element will be referred to hereinafter as the "actuation-reaction vibration" of the casing. Ordinarily, the actuation-reaction vibration of the casing element at least crudely approximates a regular or periodic vibration throughout intervals of operation of considerably more than momentary duration and, although the frequency thereof may vary noticeably from one such operating interval to another, the actuation-reaction vibration of the casing may be thought of generally as being more or less of a periodic character. It has been established by observation of the total vibratory motion produced in the handle-equipped casing structure simultaneously with the repetitive delivery of impact forces toward and to the work object that the total vibratory motion comprises such approximately periodic longitudinal actuation-reaction vibration as an incessantly active component thereof and also comprises a definitely non-periodic component consisting of unpredictably-timed but frequent longitudinal displacements of the casing, often through larger amplitudes than the more uniform amplitudes of such incessantly active component, which are energized by obviously non-periodic and non-uniform elastic rebound movements of the impact-transmitting parts of the tool away from the work object; and such sequential but irregular longitudinal displacements of the casing structure by elastic rebound or reaction forces transmitted from the work object through such rebounding parts to the casing will be referred to hereinafter as the "work-reaction vibration" thereof. The highly objectionable character of the total vibration of the handle-equipped casing which thus comprises such incessantly active actuation-reaction and such unpredictably active work-reaction components is readily appreciated in consequence of the high frequency (e.g., 1200 cycles per minute) and substantial displacement (e.g., 0.25 inch) of the actuation-reaction component and of the often larger displacements (e.g., up to 0.75 inch) of the work-reaction component which are typical of the normal operation of such power-actuated percussive tools. Also, referring again to the reversing longitudinal reaction force developed in association with the reversing longitudinal force employed to propel the hammer or piston element through its reciprocatory motion whereby repetitive impact force is delivered toward and to the work object, it is found that the net effect of this reaction force over any interval of continuous operation of the tool is to apply thereto a force acting away from the work object which combines with elastic rebound or reaction forces transmitted from the work object to the tool to aggregate a longitudinal recoil force thereupon which if not opposed would accelerate the entire tool away from the work object until it would no longer be in useful impact-transmitting engagement therewith. Therefore, it is necessary that the operating tool be urged toward the work object by a longitudinal force opposing and preventing such disengagement of the tool from the work object by this recoil force, in order to continue useful work thereupon by the continued repetitive delivery of impact force thereto; and this longitudinal force which must be applied to the tool in opposition to such longitudinal recoil force is generally referred to as the "feeding force."

Further considering such a 1-casing vibratory hand-held power-actuated percussive tool, it should be noted that the composition of the total value of the feeding force applied thereto during its delivery of repetitive impact force to a work object depends upon the position in which the tool is employed. When the tool is operated with its longitudinal axis oriented vertically so that it delivers repetitive impact force downwardly to an underlying work object, the direction of the recoil force is vertical and upward, and the total value of the opposing feeding force is made up of the sum of manual and gravitational terms; the manual term being contributed by the downwardly-directed push of the worker upon the handles of the tool and the gravitational term being contributed by the downwardly-directed pull of gravity on the casing and parts contained therein. But when the tool is employed with its longitudinal axis oriented horizontally so that it delivers repetitive impact force sidewardly to the vertical surface of a wall, the direction of the recoil force is horizontal and away from the wall, and the opposing feeding force, to which gravity cannot contribute, consists solely of the manual term contributed by the sidewardly-directed push of the worker on the handles of the tool in the direction toward the wall. handles of the tool and the gravitational term being considered to be employed, the manual contribution of the worker to the total value of the feeding force may be conveniently referred to as the "manual term" or "manual component" of the feeding force, or more descriptively as the "manual push"; and in the respective cases of the tool being considered to be employed downwardly against an underlying work object or sidewardly against a wall as aforesaid, the worker's manual contribution to the feeding force may be correspondingly more particularly referred to as "manual down-push" or "manual side-push." The gravitational contribution to the total value of the feeding force in all non-horizontal orientations of the tool, which may be either positive or negative depending upon whether the tool is directed toward the work object at an angle below or above the horizontal, may be referred to as the "gravitational term" or "gravitational component" of the feeding force.

It should be understood that any competently engineered design of any such 1-casing vibratory hand-held power-actuated percussive tool is developed with reference to an assumed normal feeding force having a particular value which it is desirable to maximize, subject to limiting practical considerations, because of a relationship between feeding force and working speed whereby any increase in such assumed normal feeding force permits achievement by competent design of a corresponding increase in the working speed of the tool. While complete statement of this relationship is complex, its practical importance can be appreciated from two of its simpler special forms, namely: (A) that if other design factors including the weight of the blow-striking element remain unaltered, the attainable percussive output in terms of the frequency of delivery of blows of specified striking energy and therefore the working speed for which the tool is designed can be increased in direct proportion to the feeding force as such assumed value of the feeding force is increased, and correspondingly the degree of approximation to such attainable percussive output and to such design working speed which is realized in actual use of the tool depends upon the degree of approximation of the actually supplied feeding force to such assumed value thereof, and (B) that if the value of the actually supplied feeding force is decreased to zero the tool will perform no useful work whatever.

In the typical employment of a 1-casing vibratory hand-held power-actuated percussive tool generally representative of the various functionally specialized types of such tools, it will be applied to the work object with a great diversity of angular orientations of its reciprocatory or longitudinal axis including the three respective cases of its being directed to the work object horizontally (i.e., with such axis thereof disposed horizontally) so that the total value of the feeding force becomes equal to the manual component thereof by virtue of the gravitational component thereof becoming equal to zero, and at angles above the horizontal so that the total value of the feeding force becomes less than the manual component thereof by virtue of the gravitational component thereof becoming negative, and at angles below the horizontal so that the total value of the feeding force becomes greater than the manual component thereof by virtue of the gravitational component thereof becoming positive.

Then, as concerns the first two of these three cases in which the 1-casing percussive tool is directed to the work object either horizontally or at angles above the horizontal, it is evident from (B) that development by manual exertion by the worker of a positive and significant value of the manual component of the feeding force is an indispensable condition to the performance by the tool of any useful work whatever is either of such cases.

Furthermore, as concerns the third case in which a 1-casing percussive tool is directed toward the work object at angles below the horizontal and with particular reference to such a tool of one of the smaller types, such as riveting or chipping hammers, which are too light in weight to elevate the gravitational component of the feeding force to any very contributive value even in the most favorable instance of the tool being directed vertically against an underlying work object, it is evident from (A) that the development by the worker of a substantial value of the manual component of the feeding force is an indispensable condition to the accomplishment of work by any such smaller tool at an economically justifiable rate.

Finally, as concerns this third case in which a 1-casing percussive tool is directed toward the work object at angles below the horizontal and with particular reference to such a tool of one of the heavier types, such as a paving breaker, which at least in near-to-vertical orientations does elevate the gravitational component of the feeding force to very contributive values but is correspondingly somewhat fatiguing for the worker to handle, and consequently is designed to operate at a normal working speed based on an assumed normal feeding force consisting to the extent of 25% to 40% thereof of its manual component so as to avoid the necessity of further increasing the weight of the tool in order to achieve such normal working speed, it is also evident from (A) that the development by the worker of a substantial value of the manual component of the feeding force is an indispensable condition to realizing even a fair approximation to the normal working speed of any such heavier tool.

In view of the conclusion from the foregoing explanations that the development by the worker of a substantial value of the manual component of the feeding force is indispensable to the useful or efficient employment of the representative 1-casing vibratory hand-held power-actuated percussive tool under consideration, such manual component or term of the feeding force may hereinafter be more descriptively referred to as the "indispensable manual component" or as the "indispensable manual term" of the feeding force, or yet more descriptively as the "indispensable manual push." And inasmuch as it was made evident during these same explanations that the gravitational component of the feeding force may be in any particular instance of use of the tool be either importantly effective, or unimportantly effective, or entirely ineffective, or negatively effective, depending upon the orientation of the tool in that particular instance of its use and also upon whether the tool is heavy or light in weight in accordance with the particular functional type thereof, it will sometimes be convenient hereinafter to refer more descriptively to such gravitational component or term of the feeding force as the "conditionally effective gravitational component" or as the "conditionally effective gravitational term" of the feeding force.

Now, in consequence of the essential identity of the physical actions occurring between the casing, and blow-striking element contained therein, and work object in the respective instances of the hereinabove discussed 1-casing vibratory hand-held power-actuated percussive tool, and of the vibratory inner percussive tool structure comprised by the aforesaid hand-held power-actuated 2-casing percussive tool considered generally and indiscriminately as being any such tool either as disclosed in the prior art or as herein inventively improved, it will be evident that each of the several terms pertaining to casing vibration, recoil force, and feeding force which have been defined or employed with reference to such 1-casing percussive tool applies in the same sense with respect to the inner percussive tool structure of such 2-casing percussive tool, with the distinction that, because of the inclusion of the outer casing element in the structure of the 2-casing tool, the gravitational component of the feeding force employed in the operation thereof, which as in the case of the 1-casing tool will develop from the entire weight of the tool, is divided into two parts respectively resulting from the action of gravity upon the inner percussive tool structure and upon the outer casing thereof and respectively hereinafter sometimes conveniently referred to as the "internally developed part" and the "externally developed part" of the gravitational component of the feeding force, and with the further distinction that, since only the outer casing of the 2-casing tool is equipped with handles, the indispensable manual component of the feeding force is developed in entirety upon such outer casing. Accordingly, such manual component hereinafter may sometimes be referred to more fully as the "externally developed" indispensable manual component (or term) of the feeding force. Thus the total value of the feeding force which urges the inner percussive tool structure of the 2-casing tool toward the work object is aggregated of three terms which are, respectively, such internally developed part and such externally developed part of the gravitational component thereof and such externally developed indispensable manual component thereof. It should be borne in mind that the feeding force so composed and each of these three signed terms composing it is, with reference to the construction of the 2-casing tool, is longitudinal force.

It will also be evident, as concerns the hand-held power-actuated 2-casing percussive tool thus generally considered, that the delivery from its outer casing of the longitudinal resultant or sum of such two externally developed longitudinal terms of the feeding force for application in aggregation with such internally developed longitudinal term thereof to its vibratory inner percussive tool structure necessarily implies the embodiment by the mechanism of such 2-casing tool, as an essential component in addition to the outer casing and inner percussive tool structure comprised thereby, of a force-transmitting system linking such outer casing to such inner percussive tool structure for effectuating such longitudinal force delivery thereto during intervals of operation in which the total vibratory motion of the inner percussive tool structure produces rapidly repetitive longitudinally reciprocatory displacements of the inner percussive tool structure relative to the outer casing.

It will also be evident that, in order to effectuate such longitudinal force delivery from the outer casing to the vibratory inner percussive tool structure, the required force-transmitting linkage must be connected in some suitable manner with the outer casing for receiving such force therefrom, and likewise must be connected in some suitable manner with the inner percussive tool structure for delivery of such force thereby. It will be convenient hereinafter sometimes to refer to the portion of the outer casing defined by such connection of the force-transmitting linkage therewith as the "force-input station" carried by the outer casing, and similarly to refer to the portion of the inner percussive tool structure defined by such connection of the force-transmitting linkage therewith as the "force-delivery station" carried by the inner percussive tool structure. It will also be convenient to consider the dimension of the force-transmitting linkage extending longitudinally of the 2-casing tool from such force-input station carried by its outer casing to such force-delivery station carried by its inner percussive tool structure as the *length* of such linkage.

It will then be evident also, because the longitudinal distance between such force-input and force-delivery stations respectively carried by the outer casing and inner percussive tool structure cyclically increases and decreases with the vibratory motion of the inner percussive tool structure relative to the outer casing during operation of the 2-casing tool, that the required force-transmitting linkage interconnecting such two stations must be adapted to undergo cyclic variations in length during operation of the tool, and that, in order for such linkage to be able to accomplish its essential function during operation of the tool, it be operative during such cyclical variations of its length to transmit longitudinal force from the one to the other of such two stations.

It will also be evident, in further reference to the hereinbefore specified limited longitudinal reciprocatory movement of the inner percussive tool structure relative to the outer casing, that some limitation of the amount of such movement is necessary to maintain the 2-casing tool in an assembled state, and that the positive provision of such necessary limitation requires the incorporation in the 2-casing tool of abuttably cooperative stop means respectively carried by or otherwise co-movable with its outer casing and its inner percussive tool structure and extending transversely of or in relation to its longitudinal axis. Furthermore, it is evident that the length of the limited range of the longitudinal reciprocatory movement of the inner percussive tool structure relative to the outer casing which is determined by such cooperating stop means should be sufficiently greater than the length of the range of the total vibratory motion of the inner percussive tool structure to permit control in some suitable manner of such vibratory range to a normal condition of intermediacy within such greater range limited by such cooperating stop means, so as normally to prevent such vibratory motion of the inner percussive tool structure from actuating such cooperative stop means into repetitive solid-to-solid impact engagements or other decelerative-and-accelerative engagements generally classifiable as impact engagements, whereby vibration would be transmitted from the vibratory inner percussive tool structure to the outer casing.

These several points together with preceding matter contained herein concerning the construction of the aforesaid hand-held power-actuated 2-casing percussive tool, considered generally and indiscriminately as being any such tool either as disclosed in the prior art or as herein inventively improved, may be recapitulated and assembled within the tripartite form of the basic vibratile structure of which such 2-casing tool is a specifically useful exemplification by summarizing the essential composition thereof as including the combination of (1) an *inner percussive tool structure* which comprises a casing without handles provided with stop means extending transversely relative to an axis of such structure identified as the longitudinal axis thereof, and which, when operated in the same manner as the hereinbefore described 1-casing percussive tool to deliver repetitive longitudinally-directed impact force to a work object, likewise simultaneously exhibits a violent longitudinal vibratory motion of such casing thereof and requires to be maintained in useful impact delivering engagement with the work object by a longitudinal feeding force directed toward the work object, and (2) *a handle-equipped outer casing* in which the occurrence of vibration is objectionable and which is cooperable with such inner percussive tool structure for relative longitudinal reciprocatory movement over a limited range determined by the aforesaid stop means and therewith abuttable stop means carried by or otherwise co-movable with such outer casing to be sufficiently greater than the range of the total vibratory motion of such inner percussive tool structure to permit control in some suitable manner of such vibratory range to a normal condition of intermediacy within such greater range limited by such cooperating stop means, so as normally to prevent such vibratory motion of the inner percussive tool structure from actuating such abuttably cooperative stop means into repetitive impact engagements whereby vibration would be transmitted from the vibratory inner percussive tool structure to the outer casing, and (3) a *force-transmitting linkage* which extends longitudinally from a force-input station carried by the outer casing to a force-delivery station carried by the vibratory inner percussive tool structure and is adapted to undergo cyclic variations in length as the longitudinal distance between such force-input and force-delivery stations cyclically increases and decreases with the vibratory motion of the inner percussive tool structure relative to the outer casing and which force-transmitting linkage is operative during such cyclical variations of the length thereof for receiving at such force-input station the longitudinal resultant of the externally developed indispensable manual component and the externally developed part of the conditionally effectively gravitational component of the feeding force and for transmitting the same to such force-delivery station for aggregation with the internally developed part of such conditionally effective gravitational component so as to complete the aforesaid longitudinal feeding force consisting of these three signed terms in totally effective application to such vibratory inner percussive tool structure.

It should be noted that such relatively movable abuttably cooperative stop means employed for interrelating the components (1), (2), and (3) of this generally defined tool composition in the manner described may be incorporated therein either within or externally of the outlines of such force-transmitting linkage component (3); and, in either of such alternative cases, may be regarded as sub-components of such tool composition comprised either by such force-transmitting linkage component (3) thereof, or respectively by such inner vibratory percussive component (1) and by such outer handle-equipped casing component (2) thereof.

Also and as concerns simplified terminology the contribution to the total value of the feeding force aggregated upon such inner vibratory percussive component (1) which has thus been described in detail as the longitudinal resultant of the externally developed indispensable manual component and the externally developed part of the conditionally effective gravitational component received at the force-input station on such outer handle-equipped casing component (2) by such force-transmitting linkage component (3) may sometimes hereinafter be more briefly referred to as the "indispensable externally developed component" or as the "indispensable externally developed term" of the feeding force.

Also, as further concerns convenient abbreviations of language, the longitudinal positional relation between such inner vibratory percussive component (1) and such therewith longitudinally relatively reciprocable outer handle-equipped casing component (2) which has thus been described in detail as a normal condition of intermediacy of the range of the total vibratory motion of such inner component (1) within the greater range of movement thereof relative to such outer component (2) by such abuttably cooperative stop means, whereby normally such vibratory motion of the inner component (1) is prevented from actuating such stop means into repetitive impact engagements causing transmission of vibration from such inner component (1) to such outer component (2), may sometimes hereinafter be more briefly referred to as the "condition of impact-preventing intermediacy" obtaining between such two components (1) and (2), or yet more briefly as the "positional stability" therebetween, or of either of such two components relative to the other.

Continuing on the basis thus set forth to prepare a background of reference to facilitate consideration of the advances beyond prior art percussive tools, and more particularly of such advances directly relating to 2-casing percussive tools, it becomes pertinent to state that any of the numerous 2-casing percussive tools of the prior art which is properly designed for transmission of such indispensable externally developed term of the feeding force from such outer component (2) to such inner component (1) thereof can be classified, according as the length-variable force-transmitting linkage component (3) thereof is an associatively length- and stress-variable element such as a Hooke's law spring or an independently length- and stress-variable element such as the pneumatic constant-force linkage disclosed in my aforesaid Patent No. 2,400,650, as being either an *objectionably vibratory 2-casing percussive tool* (i.e., one in which substantial vibration is communicated from such inner component (1) to such outer component (2) thereof) or a *conditionally vibrationless 2-casing percussive tool* (i.e., one in which no substantial vibration is communicated from such inner component (1) to such outer component (2) thereof provided the aforesaid condition of impact-preventing intermediacy between such two components is maintained by a manual control contributed by the worker).

Evidently, then, the prior art pertaining to 2-casing percussive tools, beyond and with respect to the limitations of which my present invention defines important advances, can be conveniently summarized by describing and comparing the advantages and disadvantages of typical exemplifications of these two classes of 2-casing percussive tools which together comprise the entire relevant prior art in 2-casing percussive tools; and, with the object of simplifying the necessary descriptive and comparative material, I shall now proceed to reference the same to carefully planned typifying and explanatory drawings, consisting of the FIGURES 1 to 10, among which FIGURES 2, 3, 6, 7, and 8 represent an objectionably vibratory 2-casing percussive tool, while the remaining FIGURES 1, 4, 5, 9, and 10 represent a conditionally vibrationless 2-casing percussive tool.

Furthermore, since the distinction between the two basic classes of 2-casing percussive tools exemplified in these drawings inheres essentially and only in the specific differentiation between their respective special forms of length-variable force-transmitting linkage components (3), comparison of the two basic classes has been facilitated by maintaining exact identity throughout the drawings as between the respective components (1) and as between the respective components (2) of the two exemplary structures shown therein.

As depicted in the drawings, then, the respective inner percussive tool structures (1) of the exemplary objectionably vibratory 2-casing percussive tool, shown in FIGURES 2, 3, 6, 7, and 8, and of the exemplary conditionally vibrationless 2-casing percussive tool, shown in FIGURES 1, 4, 5, 9, and 10, are identical, and each of such inner percussive tool structures is seen to be generally denoted by the numeral 20 and to comprise a casing without handles provided with stop means consisting of the upper and lower ends of the slots 62 formed therein. As best seen in FIGURE 1, each of such identical inner percussive tool structures embodies a reduced-diameter packed upper end portion comprising a piston 52 connected by a piston-rod or stem portion 53 with the main body portion 54 thereof which is terminally provided with a pair of bearing surfaces 61. It is important to state for later reference that the *force-delivery station* carried by each of such identical inner percussive tool structures is defined by the *upwardly-facing surface of the piston portion 52* thereof.

Directing attention now to the likewise identical handle-equipped outer casings (2) respectively comprised by such objectionably vibratory 2-casing percussive tool and by such conditionally vibrationless 2-casing percussive tool, each of such outer casings is seen to be generally denoted by the numeral 56 and to be cooperable with the therewithin enclosed inner percussive tool structure 20 for relative longitudinal reciprocatory movement over a limited range determined by the aforesaid stop means, consisting of the upper and lower ends of the slots 62, and therewith abuttable stop pins 64 each carried by such outer casing and received within one of the slots 62 in the manner shown. Furthermore, it will be observed that each such outer casing interiorly comprises a main cylinder portion and a reduced-diameter cylinder portion respectively adapted to close-fitting free-sliding cooperation with the aforesaid main body portion 54 and reduced-diameter piston portion 52 of the therewithin enclosed inner percussive tool structure 20, and that the entire interior of such outer casing 56 below the piston 52 is maintained at atmospheric pressure by suitably venting it with slots 67 and appropriate perforations of the lower end closure thereof, while the reduced-diameter cylinder portion above the piston 52 is provided with a cap or cylinder-head member 58. It is important to state for later reference that the *force-input station* carried by each of such identical handle-equipped outer casings is defined by the *downwardly-facing surface of the cylinder-head member 58* thereof.

Turning now from these points of structural identity between the objectionably vibratory and conditionally vibrationless 2-casing percussive tools herein described as together exemplifying the entire prior art in 2-casing percussive tools, in order to further clarify the hereinbefore defined essential distinction between these two basic classes of 2-casing percussive tools, and to this end directing attention to the *non-identical* force-transmitting linkages (3) respectively comprised by such exemplary objectionably vibratory and conditionally vibrationless 2-casing percussive tools, it is seen that the force-transmitting linkage extending between the force-input station carried by the outer casing and force-delivery station carried by the inner percussive tool structure is, in the case of such objectionably vibratory tool as shown in FIGURES 2, 3, 6, 7, and 8, a Hooke's law spring; and is, in the case of such conditionally vibrationless tool as shown in FIGURES 1, 4, 5, 9, and 10, a pneumatic constant-force linkage which, as disclosed in my aforesaid Patent No. 2,400,650, communicates the same force between its ends regardless of changes in its length.

One comparative functional consequence of this structural distinction, which pertains to the problem of vibration transmission from the inner percussive tool structure to the handle-equipped outer casing through the force-transmitting linkage, is clearly brought out in FIGURES 2, 3, 4, and 5. Referring first to FIGURES 2 and 3, it is seen that as the inner percussive tool structure vibrates upwardly from the position thereof shown in FIGURE 2 through the distance V, to the position thereof shown in FIGURE 3, the force-transmitting linkage consisting of the Hooke's law spring H is correspondingly compressed, and therefore caused to deliver an increased upward thrust to the outer casing whereby the outer casing is vibrated upwardly through the corresponding distance $M_v$. Now referring to the FIGURES 4 and 5, it is seen that as the inner percussive tool structure vibrates upwardly from the position thereof shown in FIGURE 4, through the distance V, to the position thereof shown in FIGURE 5, the force-transmitting linkage consisting of the pneumatic constant-force column indicated by the stipple shading is correspondingly shortened, without however being caused to deliver any increase in upward thrust to the outer casing, wherefore the outer casing is not vibrated upwardly through any corresponding distance.

A second comparative functional consequence of the aforesaid structural distinction, which pertains to the problem of vibration transmission from the inner percussive tool structure to the handle-equipped outer casing through the abuttably cooperative stop means, is clearly brought out in FIGURES 6, 7, 8, 9 and 10. Referring first to FIGURES 6, 7, and 8, it is seen that increases in the indispensable externally developed terms of the feeding force, symbolized in FIGURE 7 by the addition of weight (2) to weight (1) and in FIGURE 8 by the addition of weight (3) to weights (1) and (2), cause only the corresponding limited depressive movements $M_s$ (2) and $M_s$ (3), without however destroying the condition of impact-preventing intermediacy initially obtaining between the inner percussive tool structure and outer casing under the lesser value of the indispensable externally developed term of the feeding force symbolized in FIGURE 6 by weight (1). Now referring to FIGURES 9 and 10, it is seen that even the most minute increase in the indispensable externally developed term of the feeding force symbolized in FIGURE 10 by the addition of the apothecary's weight (4) to the weight (1) will destroy the condition of impact-preventing intermediacy initially obtaining between the inner percussive tool structure and outer casing under the minutely lesser value of the indispensable externally developed term of the feeding force symbolized in FIGURE 9 by the weight (1).

In the light of these observations, it is one of the principal objects of my present invention to provide an improved form of hand-held power actuated 2-casing percussive tool comprising inner percussive tool and outer casing components (1) and (2) as aforesaid, and which improved tool includes force-transmitting linkage (3) which will be effective to prevent the transmission of vibration through itself from such component (1) to such component (2) by virtue of incorporating a factor of constancy of force and at the same time to prevent the transmission of vibration through the abuttably cooperative stop means by virtue of contributing a factor of positional stability whereby the requisite condition of impact-preventing intermediacy between the inner percussive tool structure and outer casing is strongly and automatically maintained.

Numerous additional objects and advantages of the invention will become aparent as the specification proceeds.

Specific exemplary embodiments of the invention are illustrated in FIGURES 11 through 26d of the drawings in which:

FIGURE 11 is a longitudinal sectional view of a 2-casing percussive tool; the vibratory inner percussive tool structure being substantially shown in side elevation, and a large constant pressure tank which may be used with the tool structure, if desired, being shown in phantom.

FIGURES 15 through 18, inclusive, are broken longitudinal sectional views showing the upper-end portion of the composite tool structure and respectively illustrating (a) the normal interrelation of the handle-equipped outer casing and vibratory inner percussive tool structure with an external load or feeding force of preselecting magnitude being applied to the outer casing, (b) the accommodation of an increase in such external load or feeding force which enables the outer casing and vibratory inner percussive tool structure to maintain the same interrelation shown in FIGURE 15, (c) the accommodation of an upward vibratory displacement of the inner percussive tool structure without an accompanying displacement of the outer casing—the external load or feeding force being of essentially the same magnitude as indicated in FIGURE 15, and (d) the accommodation of an upward vibratory displacement of the inner percussive tool structure without an accompanying displacement of the outer casing—the external load or feeding force being of essentially the same magnitude as indicated in FIGURE 16.

FIGURES 19 and 20 are, respectively, a longitudinal sectional view of a modified 2-casing percussive tool embodying the invention; and a side view in elevation of the vibratory inner percussive tool structure rotated approximately 90° from the position shown in FIGURE 19 to illustrate the orientation of certain flow passages therethrough—portions of the structure being broken away and illustrated in section for clarity.

Figure 21:
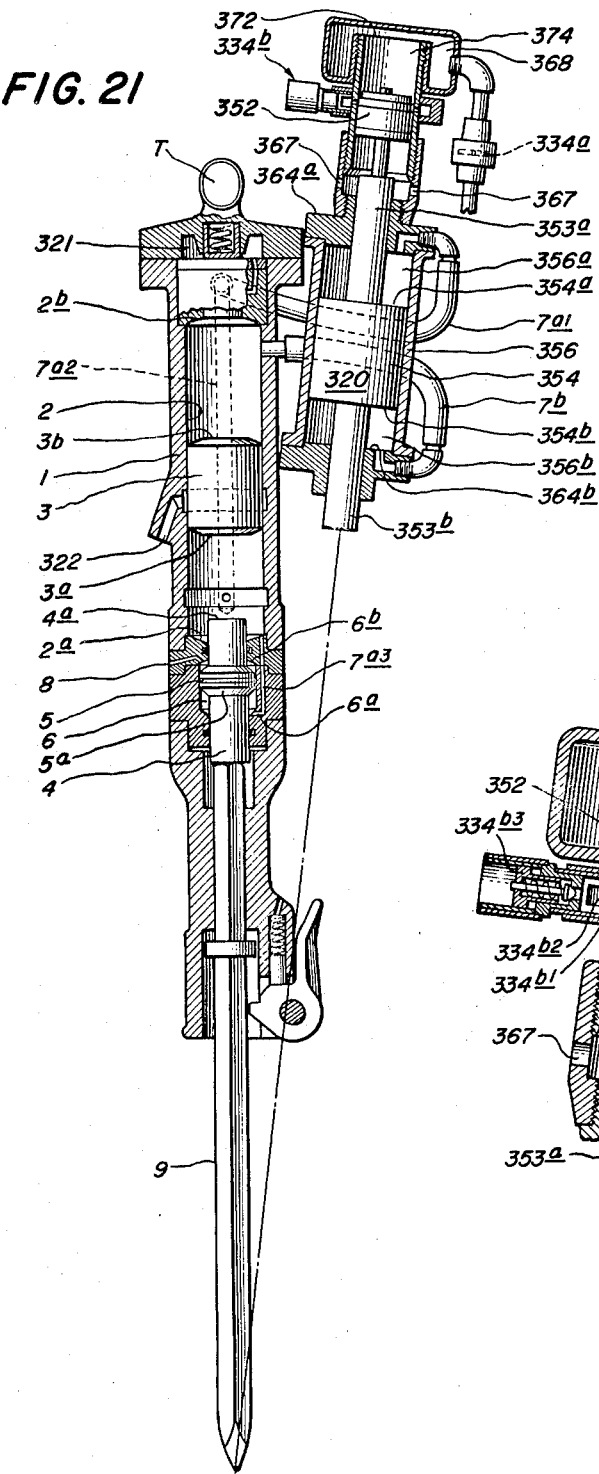
Figure 22:
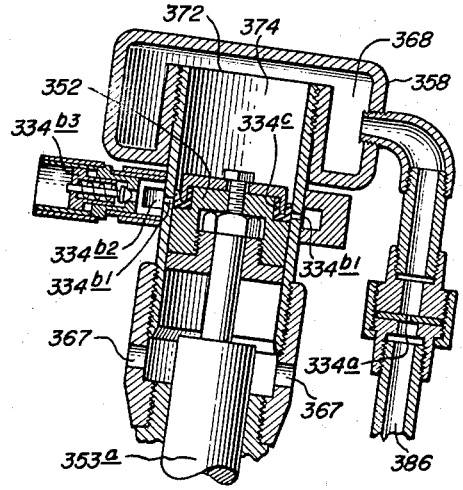

FIGURES 21 and 22 are, respectively, a longitudinal sectional view of an essentially conventional, single-casing vibratory percussive tool except for its being equipped with an attachment that makes its operation substantially vibrationless; and an enlarged broken vertical sectional view of the upper-end portion of the attachment shown in FIGURE 21.

Figure 23:
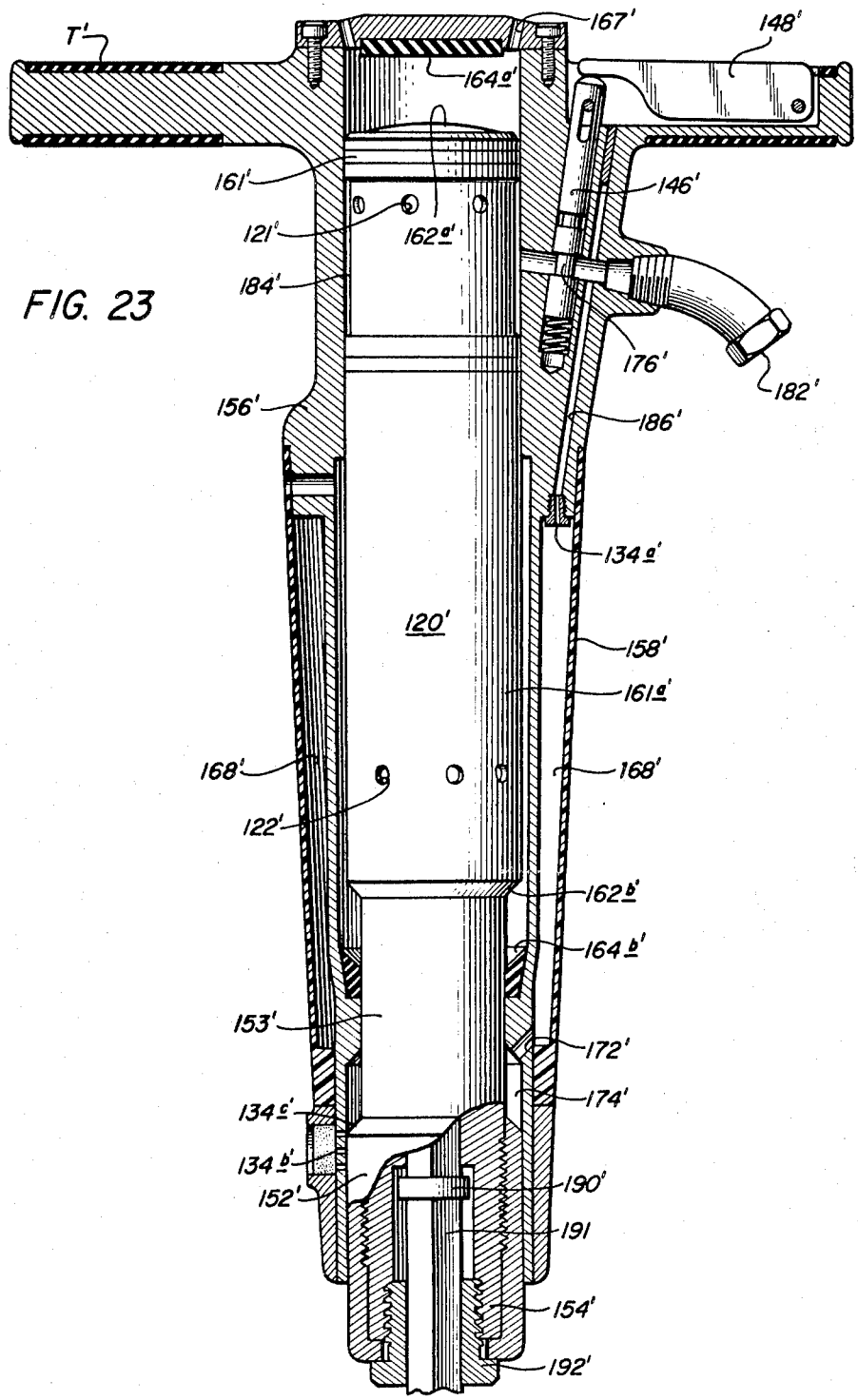

FIGURE 23 is a longitudinal sectional view of a 2-casing percussive tool structure showing still another embodiment of the invention.

Figure 24:
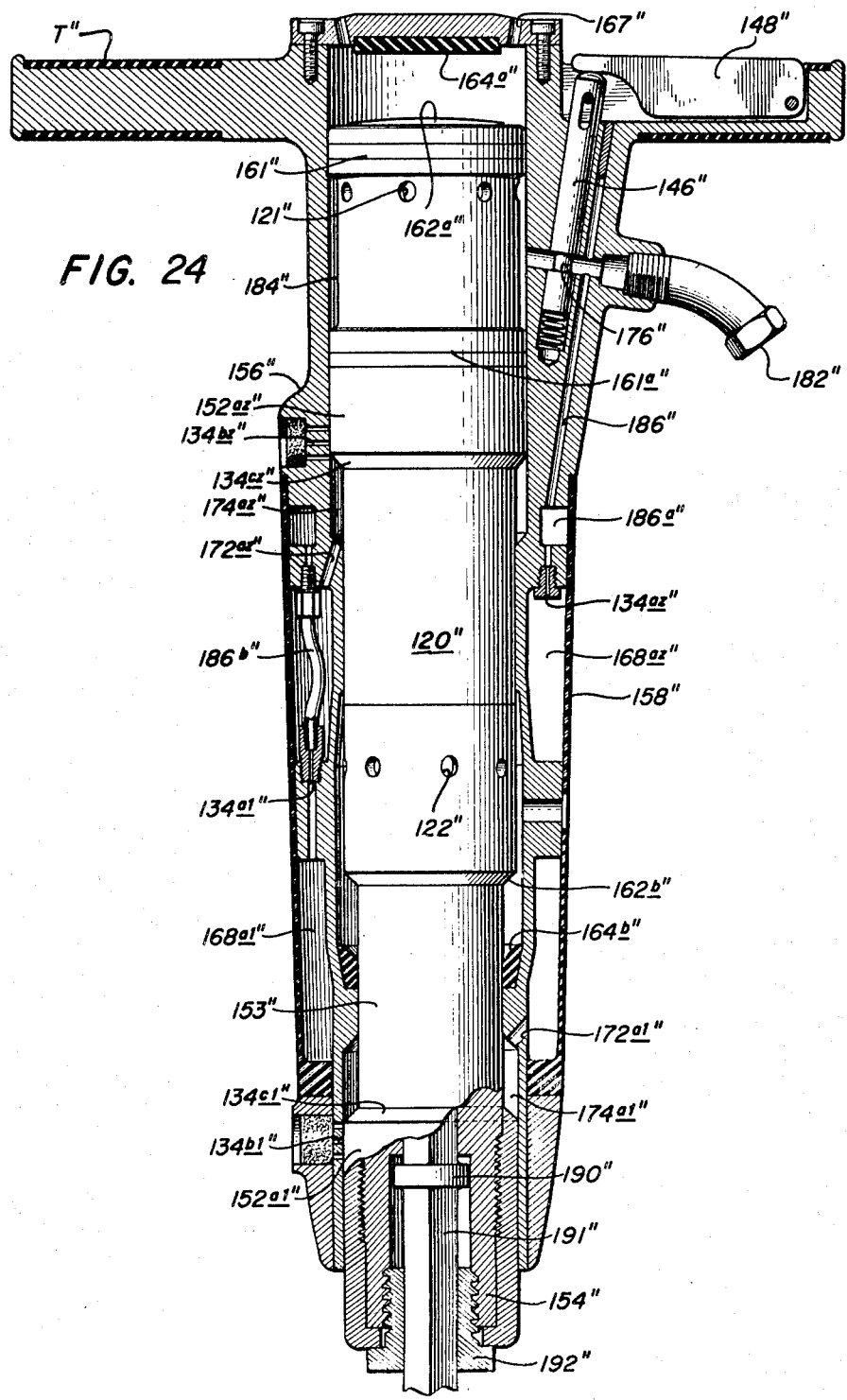

FIGURE 24 is a longitudinal sectional view of a 2-casing percussive tool structure showing yet another embodiment of the invention.

FIGURES 25a through 25d are each a longitudinal sectional view of the 2-casing percussive tool structure shown in FIGURE 24 and are identical thereto and illustrate various operational conditions of the tool structure during demolition operation thereof.

FIGURES 26a through 26d are each a longitudinal sectional view of the 2-casing percussive tool structure shown in FIGURE 24 and are identical thereto and illustrate various operational conditions of the tool structure during spike extraction or pull-out operation thereof.

The invention is specifically exemplified in FIGURE 11 in a hand-held, fluid-actuated, 2-casing percussive tool which, as brought out hereinbefore, includes essentially a handle-equipped outer casing 156, a longitudinally-vibratory, inner percussive tool structure 120, and force-transmitting linkage means interconnecting the outer casing 156 and inner percussive tool structure 120. Such linkage means comprises a pneumatic column defined between the downwardly-facing inner surface of the cap 158 of the outer casing 156 and the upwardly-facing surface 134c of a piston 152 carried by the inner percussive tool structure 120. The piston 152 is reciprocable within a cylinder 174 provided by the outer casing 156 within the cap 158 thereof.

Although the internal structural composition of a typical percussive tool structure 120 will be set forth in detail hereinafter in order to provide a description of a 2-casing percussive tool structure in its entirety, for purposes of understanding the present invention it is sufficient to state that such inner tool structure 120 is characterized by exhibiting repetitive longitudinal displacements or vibratory movements along the longitudinal axis thereof during its normal operation. However, it is intended that the handle-equipped outer casing 156 remain substantially vibrationless throughout such periods of vibratory operation of the inner tool structure; and, therefore, it may be said that the inner percussive tool structure defines a necessarily or unavoidably vibrating member, the handle-equipped outer casing 156 defines a member in which the occurrence of vibration is undesirable or objectionable, and the linkage operative therebetween defines a means for transmitting a necessary force between such unavoidably vibrating member and the member in which the occurrence of vibration is undesirable.

Evidently, then, the inner percussive tool structure 120 is related to the outer casing 156 for relative movement with respect thereto along the longitudinal or vibratory axis of the inner tool structure, and such interrelation thereof is afforded by providing the tool structure 120 with a generally cylindrical configuration along the lower-end portion 154 thereof which is slidably received within a cylinder provided therefor by the outer casing 156; and more specifically, the cylindrical lower-end portion 154 of the tool structure has a pair of longitudinally spaced bearing elements 161 and 161a which slidably and sealingly engage the inner wall of the circumjacent casing cylinder and guide such movement of the inner tool structure.

Relative movement between the inner tool structure and outer casing is limited in each longitudinal direction by cooperative stop structure comprising elements respectively provided by the inner tool structure and outer casing and which, in this structure, include a longitudinally extending slot 162 provided along the surface of the lower bearing element 161a of the inner tool structure and a pin 164 which is threadedly received within a tapped opening provided therefor in the outer casing and which extends into the slot 162. It will be apparent that the cooperative engagement of the slot 162 and pin 164 not only limits the range of the relative longitudinal movement afforded between the inner tool structure and outer casing but also prevents relative rotation therebetween.

Extending upwardly from the bearing element 161 in a centrally disposed orientation relative to the inner tool structure, is a piston rod or stem 153 equipped at its upper end with the piston 152 and, as a consequence, the piston necessarily moves with the inner tool structure 120 and is, effectively, an integral part thereof. The cylinder 174 in which the piston 152 is sealingly slidable has an open upper end or large port 172 that communicates with a relatively large chamber or constant pressure space 168 defined within the cap 158 of the outer casing.

As stated hereinbefore, and as disclosed in Leavell et al. Patent No. 2,400,650, the composite volume defined by the chamber or space 168 and that portion of the cylinder 174 in open communication therewith is sufficiently great relative to the changes therein resulting from the vibratory displacements of the piston 152 caused by the reciprocatory movements of the inner tool structure 120, that substantially no change in pressure occurs within such composite volume as a consequence of the vibratory displacements of the piston. Therefore, the force transmitted by the linkage means between the upper surface 134c of the piston 152 and the inner surface of the cap 158 in facing relation therewith remains substantially constant during any such riciprocatory displacement of the piston 152 and inner tool structure 120.

The volume of the constant pressure space 168 can be made as large as necessary to provide the desired degree of constancy of the force transmitted by the linkage, and this is indicated in the drawings by the inclusion of a provision for connecting the space 168 to a large tank 68 through a relatively large conduit 70 adapted to communicate with the space 168 through a suitable opening 72 in the cap 158. The opening 72 and conduit 70 should be sufficiently large in cross section that substantially no pressure gradient develops in the pressure of the fluid reversibly flowing therethrough as the piston 152 reciprocates. However, it has been found that sufficient constancy of the pressure within the space 168 is obtained to maintain the outer casing substantially vibrationless without the use of such a tank.

The lower-end portion of the cylinder 174 is maintained at atmospheric pressure by continuously venting the same through one or more ports 167 in the outer casing 156. Similarly, the lower-end portion of the inner tool structure 120 is maintained at atmospheric pressure by venting the lower-end portion of the cylinder in which it reciprocates (i.e., the outer casing) through one or more suitable ports, as shown. It may be noted that the outer casing 156 completely encloses or encapsulates the inner percussive tool structure 120 both radially and axially with the exception of the spike or work member extending outwardly therefrom and through the outer casing. Such encapsulation is an especially advantageous arrangement in that it isolates, and thereby protects, the workman or tool operator from the reciprocatory movements of the inner tool structure which are in most instances quite violent, particularly where the impact forces developed within the inner percussive tool structure are of large magnitude, and, in any event, because the weight of the inner tool structure is minimized in 2-casing tools to maintain the gross weight thereof within optimum limits which results in unusually violent vibration of the inner tool structure.

The specific 2-casing percussive tool as thus far described, both in terms of structure and function, corresponds to the 2-casing tool disclosed in the aforementioned Leavell et al. Patent No. 2,400,650; and during operation of such tool, the handle-equipped outer casing 156 thereof will remain substantially vibrationless even though the inner percussive tool structure 120 vibrates quite violently relative thereto. However, as explained hereinbefore, such 2-casing percussive tool is unable to automatically accommodate or compensate for changes in the external feeding force or manual down-push applied to the outer casing. Consequently, even relatively small changes in the value of such force will cause displacement of the outer casing with respect to the inner tool structure within the limits of the maximum range of relative movement defined by the stop structures 162–164, as shown in FIGURES 9 and 10. The structural arrangement now to be described provides an automatically operable means to accommodate or compensate for any such changes in the external feeding force or manual down-push to provide positional stability for the tool.

This structure includes an exhaust port or escape outlet 134$^b$ to atmosphere for the cylinder 174; and in the structure illustrated in FIGURE 11, such exhaust port 134$^b$ is provided by a nipple extending through the cap 158 in sealing relation therewith and also through and in sealing relation with the annular wall defining the cylinder 174. It is evident that the piston 152, and particularly the upper surface 134$^c$ thereof, is adapted to traverse the exhaust port 134$^b$ whereupon such port may be completely closed, completely open, or partially open, depending upon the position of piston 152 at any particular time. The structure also includes a restricted inlet orifice 134$^a$ through which compressed air or other pressure fluid is supplied at reduced pressure to the constant pressure space 168.

The inlet orifice 134$^a$ is supplied with pressure fluid through a tube or conduit 186 which at one end connects therewith and at its other end communicates with an annular space 184 defined between a restricted portion of reduced diameter of the inner tool structure 120, which restricted portion is disposed between the bearing elements 161 and 161$^a$, and the circumjacent inner surface of the outer casing cylinder in which such bearing elements are reciprocable. The longitudinal dimension of the restricted portion of the inner tool structure is so related to the maximum range of relative movement afforded by the stop structure 162–164, that the conduit 186 is continuously in communication with the space 184 and is never closed by the bearing elements 161 or 161$^a$.

The annular space 184 is supplied with pressure fluid through a fitting 182 adapted to be connected to a source of pressure fluid, such as compressed air, through a suitable hose or conduit (not shown). The flow passage through the fitting 182 is selectively opened and closed by a valve 176 connected by a linkage 146 to a manually operable lever 148 carried by one of the handles T which are formed integrally with or otherwise rigidly secured to the outer casing 156. The lever 148 is spring biased in a direction to normally maintain the valve 176 in its closed position, and may be manually depressed to open the valve 176 and thereby permit operating fluid to enter the annular space 184. From such annular space the fluid flows through the conduit 186 and into the constant pressure space 168, and may escape therefrom through the exhaust port 134$^b$ whenever the port is at least partially uncovered by the piston 152.

As indicated hereinbefore, the force-transmitting linkage means defines a force-connection between the outer casing 156 and inner tool structure 120, and functions to transmit feeding force or manual down-push, etc., from the outer casing to the inner tool structure without transmitting vibration therebetween. Thus, the force transmitted through the linkage necessarily remains substantially constant for each upward and each downward vibratory displacement of the inner tool structure 120. Additionally, the force-transmitting linkage means functions to regulatively alter or adjust the value of such transmitted force to (a) automatically accommodate changes in the value of such feeding force or manual down-push, whereby a substantially force-invariable positional stability is provided, and (b) hold the range of the vibratory displacements of the inner tool structure 120 in impact-preventing intermediacy with respect to the outer casing whereby the pin 164 is maintained intermediate the ends of the slot 162 so as to prevent impact engagement therewith which, quite apparently, would result in the introduction of vibration into the outer casing 156. In describing such functions, the corrective actions that provide positional stability will be considered first with particular reference to FIGURES 12 through 14 and with FIGURE 13 being taken to illustrate the normal relative positions of the outer casing 156 and inner tool structure 120 with an external load or feeding force of some determinant value being transmitted by the connecting linkage from the outer casing.

Figure 13:
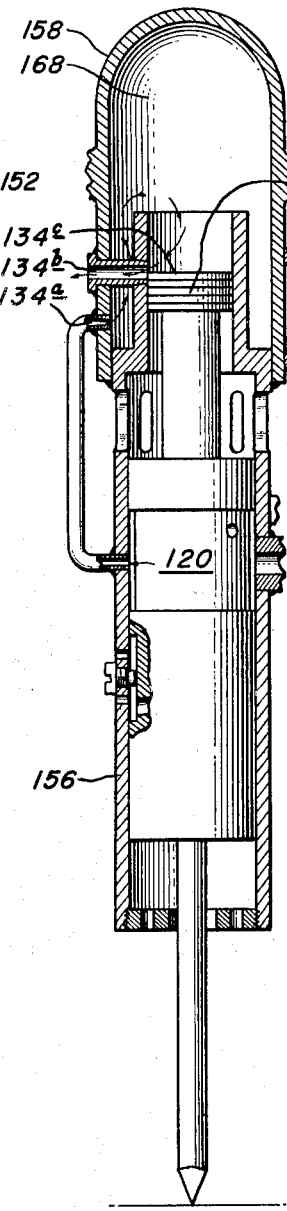

In the configuration of FIGURE 13, pressure fluid is flowing into the annular space 184, through the conduit 186 connected thereto and into the constant pressure space 168 through the inlet orifice 134$^a$ which, it may be noted, is a restricted orifice causing a pressure drop thereacross that results in the pressure within the constant pressure space 168 usually being substantially below the supply-line pressure. For example, the usual pressure within the space 168 may be in the order of 50 p.s.i. when the line pressure approximates 90 p.s.i. The pressure fluid flowing through the inlet orifice 134$^a$ fills the constant pressure space 168 and that portion of the cylinder 174 which at any time is above the upper surface 134$^c$ of the piston 152. In this figure, some of the pressure fluid is escaping from the space 168 through the exhaust outlet 134b since the position of the piston 152 leaves the exhaust outlet 134b partially uncovered.

This condition persists so long as there is no change in the value of the feeding force transmitted from the outer casing 156 and so long as the inner tool structure 120 is not operating. If, however, there is a sudden increase in the magnitude of the feeding force, such as when the operator suddenly increases the amount of the down-push being applied to the handles of the outer casing, the outer casing is displaced downwardly relative to the inner tool structure 120 since the inner tool structure is prevented from moving downwardly because of the engagement of the spike or work member thereof with an underlying concrete slab or other work material.

Figure 1:
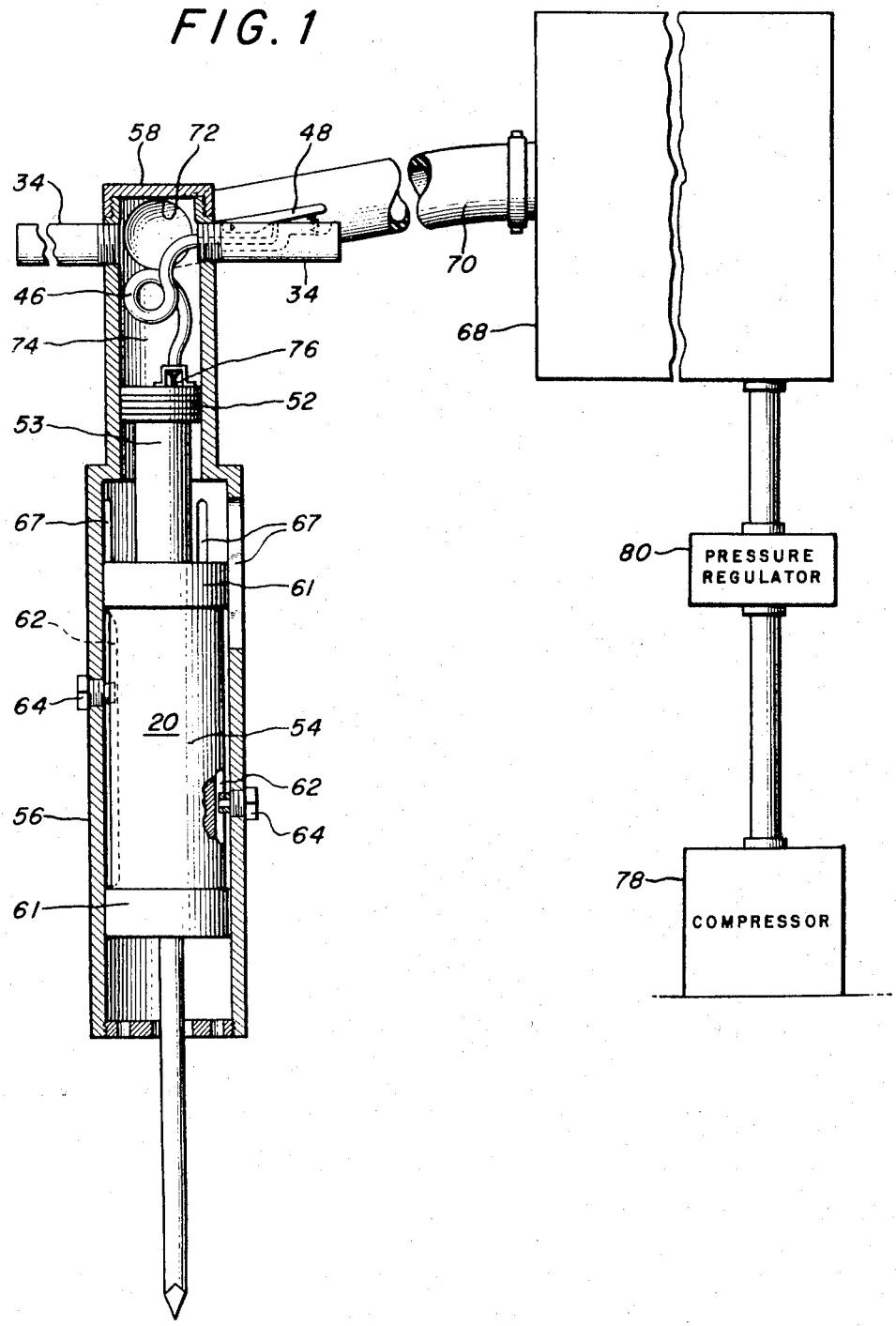
Figure 2:
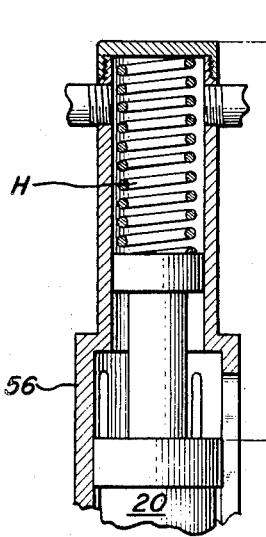
Figure 3:
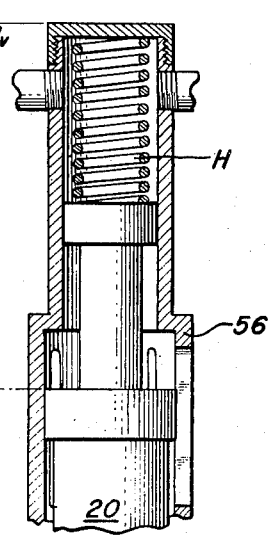
Figure 4:
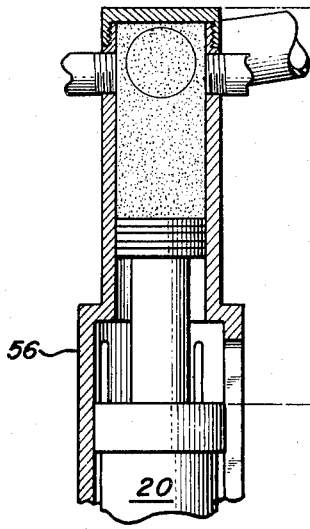
Figure 5:
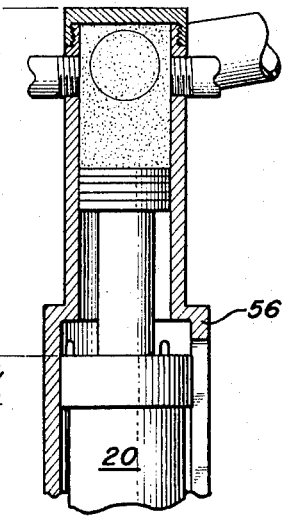
Figure 12:
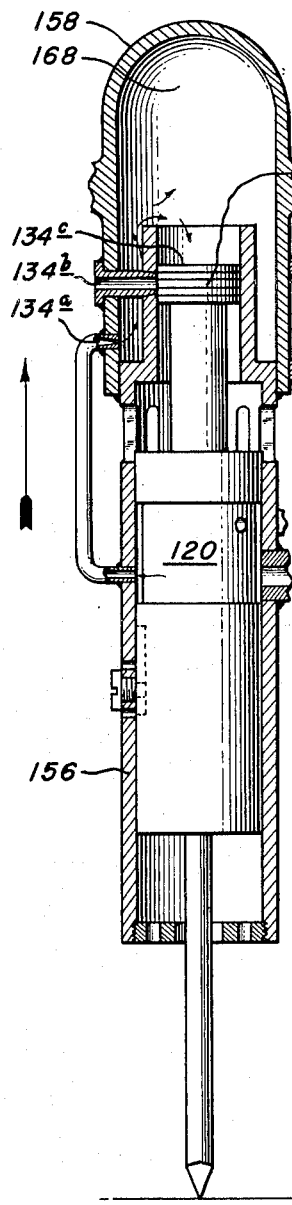
FIGURES 12, 13 and 14 are longitudinal sectional views, generally similar to FIGURE 11, respectively illustrating the relative positions of the handle-equipped outer casing and inner percussive tool structure when the externally-applied feeding force or manual down-push applied to the outer casing is (a) suddenly increased, (b) of normal magnitude, and (c) suddenly decreased.

Such downward displacement of the outer casing causes the exhaust outlet 134b to be closed to a greater degree by the piston 152 (completely closed as shown in FIGURE 12 if the increased magnitude of the down-push is sufficiently great) and the escape of fluid through the exhaust outlet 134b is necessarily decreased. As a consequence, the pressure within the space 168 will build up or increase until the force developed thereby is great enough to displace the outer casing 156 upwardly in the direction of the arrow shown in FIGURE 12; and such increase in pressure and corresponding upward displacement of the outer casing continue until the escape of air through the exhaust outlet 134b is properly adjusted to maintain the outer casing and inner tool structure in the relative position thereof shown in FIGURE 13 for the new value of the feeding force.

Figure 14:
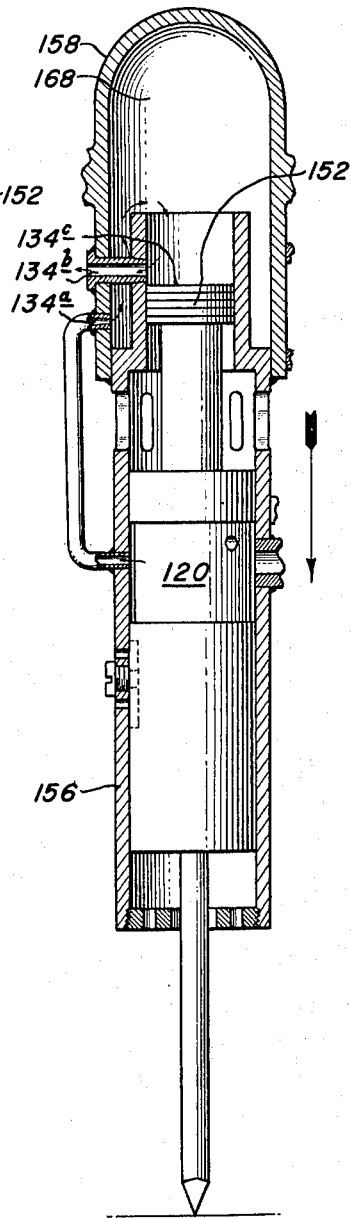

If, on the other hand, the feeding force is suddenly decreased, the outer casing 156 is displaced upwardly whereupon the exhaust port 234b is uncovered to a greater extent (completely uncovered as shown in FIGURE 14 if the reduction in the magnitude of the feeding force is sufficiently great) and as a consequence, there is a greater outward flow of fluid through the exhaust outlet 134b and necessarily, then, the pressure within the space 168 diminishes, whereupon the outer casing 156 moves downwardly in the direction of the arrow shown in FIGURE 15 until it returns to and is maintained in the position thereof shown in FIGURE 13 for the new value of the feeding force.

Thus, the automatic control or feed-back control means operates to provide the 2-casing tool structure with a force-invariable positional stability by proper corrective adjustment of the value of the force transmitted by the linkage means in accordance with increases and decreases in the magnitude of the feeding force applied to the outer casing.

FIGURES 15 through 18 diagrammatically illustrate the function of the force-transmitting linkage means both with respect to its capability of automatically adjusting the value of the constant force operative between the piston 152 and outer casing 156 to accommodate changes in the value of the feeding force to automatically maintain the desired condition of positional stability, and also with respect to its capability of transmitting force between the piston 152 and outer casing without transmitting vibration from the inner tool structure 120 to the outer casing 156 during the cyclic or vibratory displacements of the inner tool structure. More specifically, and comparing FIGURES 15 and 17, it is seen that when a loading force of predetermined value is being applied to the outer casing, it assumes a position of impact-preventing intermediacy with respect to the inner tool structure 120 for the reasons heretofore explained, and the force transmitted between the piston 152 and cap 158 of the outer casing is defined by the fluid column C, the mean density of which is indicated in a relative sense by the density of the stippling shown in FIGURE 15.

With the value of the feeding force remaining substantially the same, as shown in FIGURE 17, but with the inner tool structure 120 having vibrated upwardly relative to the outer casing, it is seen that such vibratory displacement of the inner tool structure does not transmit vibration of variable forces to the outer casing because, as shown in FIGURE 17, an upward vibratory displacement of the tool structure 120 simply displaces fluid from the column C in decreasing the length thereof whereupon the total mass of fluid in the column C is decreased, as indicated by the reduction of the density in the stippling in that figure. Consequently, the force transmitted between the cap 158 and inner tool structure 120 remains substantially constant. In this respect it should be remembered that the total volume of the constant pressure space 168 relative to changes in such volume effected by the reciprocatory movement of the piston 152 is sufficiently great so that substantially no change in pressure occurs within the space 158 by the relatively small changes in the volume thereof which necessarily accompany the reciprocatory movement of the piston.

A reverse action occurs when the piston 152 vibrates downwardly below the position thereof illustrated in FIGURE 15 with fluid simply being added to the column C as its length is increased, whereupon the force transmitted between the cap 158 and inner tool structure remains substantially constant. Thus, the force-transmitting linkage effectively accommodates cyclic displacements or vibratory movements of the inner tool structure 120 and piston 152 carried thereby while maintaining the force transmitted between the outer casing and inner tool structure substantially constant.

FIGURES 16 and 18 illustrate the same vibratory accommodation as shown in FIGURES 15 and 17 but with the feeding force substantially increased in magnitude.

FIGURES 15 and 16 diagrammatically illustrate the capability of the force-transmitting linkage to maintain a condition of positional stability between the outer casing and inner tool structure, as heretofore described with particular reference to FIGURES 12 and 14, and show that the outer casing 156 is returned to its prior position, or that the position thereof remains substantially unchanged, subsequent to any momentary change in its position which accompanies a sudden increase or decrease in the value of the feeding force or external load transmitted thereto from the outer casing. Thus in FIGURE 16 the value of the feeding force has been significantly increased and, as a consequence, the value of the constant force transmitted to the piston 152 has been increased correspondingly in order to return the outer casing to and maintain it in the position shown in FIGURE 15. The density of the fluid defining the column C is therefore increased, as shown by the greater concentration of stippling in FIGURE 16 as compared to FIGURE 15.

With regard to the function of the linkage means to maintain the range of the vibratory displacements of the inner tool strutcure 120 in impact-preventing intermediacy with respect to the outer casing, the corrective action of the feedback control means is the same as the corrective action thereof when changes occur in the magnitude of the manual down-push being applied to the outer casing. Thus, if the mean position of the range of vibratory movement of the inner tool structure tends to move upwardly relative to the outer casing, the result is essentially the same as where the outer casing tends to move downwardly relative to the inner tool structure because of an increase in the value of the manual down-push being applied to the outer casing. In either event, the exhaust opening 134b is closed to a greater degree, or for longer periods during the reciprocatory cycle of the inner tool structure and piston 152 thereof, whereupon the pressure force developed in the column C is increased. As a result thereof, the inner tool structure is urged downwardly to return the mean position to its range of reciprocatory movement to the prior location thereof. The same type of corrective action occurs in the opposite sense if the mean position of the range of vibratory movement of the inner tool structure tends to move downwardly relative to the outer casing.

These functions of the force-transmitting linkage are summarized in the chart, located below FIGURES 16 and 17, wherein the vibratory movement ($M_V$) of the outer casing 156 is shown to be equal to zero as the inner tool structure 120 vibrates through displacement having an amplitude V (compare FIGURES 15 and 17, and FIGURES 16 and 18); and wherein the load displacement or movement ($M_S$) of the outer casing is shown to be equal to zero as the value of the external load or manual down-push applied to the casing 156 is changed (compare FIGURES 15 and 16, and FIGURES 17 and 18). Therefore, the total movement or displacement of the outer casing 156 resulting from vibratory displacements of the inner tool structure 120 and from changes in the external load or manual down-push applied to the outer casing is equal to zero and may be summarized by the equation $M_V + M_S = 0$ (compare FIGURES 15 and 18, and FIGURES 16 and 17).

A modified 2-casing tool composition is illustrated in FIGURES 19 and 20, and this modified tool is substantially similar structurally and substantially identical functionally to the 2-casing tool composition heretofore described and shown most clearly in FIGURE 11. Therefore, the same numerals are used to identify the respectively corresponding elements except that the order of such numerals has been increased to the 200 series.

Thus, the handle-equipped outer casing is designated with the numeral 256 and defines a cylinder in which the longitudinally vibratory inner percussive tool structure 220 is mounted for reciprocation on spaced bearing elements 261 and 261$^a$ which slidably and sealingly engage the inner surface of such cylinder. The outer casing 256 substantially encloses the tool structure 220 both radially and axially and is equipped with a cap defining a constant pressure space 268 therein that communicates with the upper surface 234$^{c2}$ of an annular reciprocable element through the hollow interior 274 of a flexible bellows 234$^{c3}$ which, at its lower end, is sealingly secured as by means of adhesive to the annular element and which, at its upper end, is sealingly secured as by means of clamp structure to the upper end of an internal sleeve or tube provided by the outer casing 256 within the constant pressure space 268 thereof.

The cap of the outer casing 256 is provided with handles T and fluid is supplied to the constant pressure space therein through a restricted inlet orifice 234$^a$. The fluid flows therefrom into the interior 274 of the bellows and through a passage 234$^{b1}$ provided in a stem 253 which is secured to and extends upwardly from the inner tool structure and supports the annular element thereon. The fluid continues to flow through the passage 234$^{b1}$ and into the annular space 234$^{b2}$ which is defined between the restricted section of the tool structure, located intermediate the bearing elements 261 and 261$^a$, and the circumjacent inner wall of the causing cylinder in which such bearings are reciprocable.

An exhaust port 344$^{b3}$ formed through the outer casing 256 is adapted to communicate with the annular space 234$^{b2}$ and is traversed by the upper surface 234$^{c1}$ of the lower bearing element 261. The lower end of the outer casing 256 is vented through appropriate apertures, and the space surrounding the stem 253 is maintained at atmospheric pressure through vent openings 257 in the outer casing. The maximum range of relative longitudinal movement afforded between the inner tool structure 220 and the outer tool casing 256 is limited by stop structure which comprises the slot element 262 provided by the inner tool structure and the cooperative pin 264 which extends thereinto and is carried by the outer casing.

The 2-casing tool composition shown in FIGURE 19 operates in the manner heretofore described with reference to the tool shown in FIGURE 11; and, therefore, the force-transmitting linkage means transmits force between the upper surface 234$^{c2}$ of the annular element and the facing inner surface of the outer cap, and the value of such transmitted force remains substantially constant during any reciprocatory or vibratory displacement of the inner tool structure 220. The value of such substantially constant force is regulatively altered in accordance with changes in the magnitude of the external feeding force or manual down-push applied to the outer casing; and such adjustment occurs as a result of changes in the effective exhaust area of the escape port 234$^{b3}$ as determined by the location of the bearing surface 234$^{c1}$ with respect thereto.

For example, if the value of the feeding force is increased, the outer casing 256 is displaced downwardly with respect to the inner tool structure 220, whereupon the surface 234$^{c1}$ and bearing element 261 progressively close the exhaust port 234$^{b3}$ which causes the pressure within the space 268 to increase, and this resultant corrective increase in the force transmitted between the outer casing and inner tool structure causes the casing 256 to return to its prior position. Conversely, if the magnitude of the feeding force is decreased, the outer casing 256 is displaced upwardly, a greater area of the exhaust port 234$^{b3}$ is uncovered by the bearing element and surface 234$^{c1}$ thereof, and the consequent increase in the rate of fluid escape through such port effects a reduction of the pressure in the space 268, and the resultant corrective decrease in the transmitted force causes the casing 256 to return to its prior position.

It may be noted with respect to either of the structural embodiments described, neglecting frictional forces and considering the obtained condition of impact-preventing intermediacy of the inner tool structure and outer casing, that the only force capable of variation which is operative between the inner tool structure 220 and outer casing 256 is the substantially constant force defined by the fluid column operative therebetween because all other forces result from atmospheric pressure present between the lower end of the inner tool structure (120 or 220, as the case may be) and the facing lower-end closure of the outer casing, and atmospheric pressure present in the space between the upwardly-facing transverse surface of the inner tool structure surrounding the stem (153 or 253) thereof and the downwardly-facing transversely disposed surface of the outer casing located within such space. The vibratory inner percussive tool structure 120 or 220 may be of any suitable or conventional type having the characteristic of exhibiting longitudinal displacements or vibratory reciprocations along its longitudinal axis during normal operation. Thus, the percussive tool structure 120 or 220 may be a self-contained tool structure operable without external connections thereto, it may be electrically energized, energized by pressure fluid or energized in any other appropriate manner.

In the specific tool composition illustrated in FIGURE 11, the percussive tool structure 120 is a pneumatically-actuated, vibratory percussive tool which may be wholly conventional with respect to the operation thereof and in such event may have internally the structural and functional characteristics of the single-casing percussive tool structure shown in FIGURE 21 except for the attachment thereto which makes the same vibrationless. In such event, the tool structure 120 will have a main or operating cylinder, a blow-striking element or piston reciprocable therein for delivering repetitive impact forces or blows, either directly or through the intermediate agency of an anvil or tappet, to a spike or work member which is slidably carried by the tool structure for limited longitudinal movements with respect thereto. In such percussive tool the reciprocatory cycle of the piston or blow-striking element is energized by the alternate application of compressed air or other pressure-fluid charges to opposite ends thereof.

For convenience, it is desirable to describe the structural and operational characteristics of such a conventional single-casing tool, and referring to FIGURE 21, it is seen that such tool has a casing 1 providing a longitudinally extending cylinder 2 having a piston or blow-striking hammer element 3 reciprocable therein. The hammer 3 in its reciprocatory motion is adapted to repetitively strike or deliver impact forces to a tappet or anvil 4 which transmits such forces to a spike or work member 9. The tappet 4 has an enlarged central piston portion 5 reciprocable within an anvil or tappet chamber 6, and the upper surface $4^a$ of the tappet extends into the cylinder 2 and is adapted to be struck by the lower surface $3^a$ of the piston which has an oppositely-facing upper surface $3^b$. Compressed air or other pressure fluid charges are alternately directed into the opposite ends of the cylinder 2 through a conventional valve and passage system, not shown in detail, to reciprocate the piston 3 through the impact-delivering stroke and return stroke thereof.

The main cylinder 2 is exhausted to atmosphere through an exhaust opening 322, and the upper-end portion of the tappet chamber 6 is vented to atmosphere through a passage 8. The upper-end closure of the tappet chamber is designated with the numeral $6^b$, and the pressurizable surface of the tappet portion 5 facing the lower surface $6^a$ on the tappet chamber is designated with the numeral $5^a$. Also, the casing 1 is provided with a chamber 321 at the upper end thereof which forms a part of the valve mechanism which alternately directs fluid charges into the opposite ends of the cylinder 2, and the casing is equipped with handles T for manipulation of the tool.

Vibratory movements are imparted to the casing 1 by the reaction of the actuating-pressure fluid charges against the casing. More particularly, when a charge of pressure fluid is admitted into the upper-end portion of the cylinder 2 it imparts a downwardly-directed pressure force upon the upper surface $3^b$ of the piston which drives the same downwardly, and at the same time, such pressure force reacts upwardly against the upper-end closure $2^b$ of the cylinder 2 which vibrates the casing upwardly. Similarly, when a change of pressure fluid is alternately admitted into the lower end of cylinder 2, an upwardly-directed pressure force is exerted against the lower surface $3^a$ of the piston which reciprocates the same upwardly and such pressure force reacts downwardly upon the lower-end closure $2^a$ of the cylinder and lower surface $6^a$ of the tappet chamber through the connecting passage $7^{a3}$, which vibrates the casing downwardly. The magnitude of such pressure forces may be in the order of 500 pounds (line pressure of approximately 90 p.s.i. and area of the pressurizable surfaces being somewhat in excess of 5 square inches) which quite apparently is of sufficient magnitude to vibrate the casing. Since the frequency of reciprocation of the hammer 3 may approximate 1200 cycles per minute, the vibratory motion of the casing is quite severe and exceedingly objectionable.

It will be apparent that in employing the single-casing tool as thus far described for the longitudinally vibratory inner percussive tool structure 120 or 220, the casing 1 will have the handles T removed therefrom and will be suitably configurated along the outer surface thereof so as to be slidably reciprocable within the outer casing. Additionally, such inner vibratory tool may be supplied with actuating fluid in any convenient manner as, for example, through the port 121 shown in connection with the structure illustrated in FIGURE 11, and the tool may be exhausted to atmosphere through the opening 122 that communicates directly with the slot 162 which is vented to atmosphere through appropriate openings adjacent the pin 164.

It may be mentioned that the precise anvil and anvil chamber described is not found in conventional single-casing tools and has special significance in improving the working speed of the tool, as disclosed in detail in my copending patent application, No. 742,878, filed June 18, 1958, now Patent No. 3,028,841. It should also be stated that the structural composition shown in FIGURE 21 includes an anti-vibrative attachment secured to the casing 1 which defines a force-counterbalancing and force-transmitting linkage composition operative in association with such substantially conventional, vibratory, single-casing tool to make the handle-equipped casing 1 thereof substantially vibrationless during tool operation. Such an arrangement is illustrated and described in detail in the aforementioned copending patent application, now Patent No. 3,028,841, and reference may be made thereto for a detailed description thereof, the same reference numerals in the 300 series being used in FIGURES 21 and 22 as in such prior disclosure.

It should be noted that the casing 1 vibrates because of variable or intermittent forces applied thereto which come from two distinct sources; namely, from the alternate application of pressure fluid charges to opposite ends of the piston 3 for energizing the reciprocatory cycle thereof and which reactively vibrate the casing in the manner heretofore described; and from random and unpredictable recoil forces transmitted to the casing 1 through the spike or work member 9 from the concrete slab being demolished thereby. Similarly, in 2-casing tool structures the inner percussive tools 120 and 220 vibrate from the same causes. Since the single force-transmitting linkage means operative between the vibratory inner percussive tool structure and the outer casing transmits no vibration to the outer casing, it will be apparent that such force-transmitting linkage means effectively isolates the outer casing from the vibration of the inner tool structure caused both by the actuating pressure fluid forces and by the random recoil forces.

The structural embodiment of the invention illustrated in FIGURE 23 is a 2-casing percussive tool structure having a handle-equipped outer casing and an inner vibratory percussive tool structure contained therein. Structurally the tool shown in FIGURE 23 is quite similar to the 2-casing tool illustrated in FIGURE 11 and described in detail hereinbefore, and functionally these two tools are substantially identical. Therefore the same numerals are used in FIGURE 23 to identify the elements which respectively correspond to those of the tool shown in FIGURE 11, except that each number is primed to differentiate therebetween.

Thus, the tool has an outer casing 156' equipped at its upper end with handles T' that may be provided with resilient hand grips as shown. The lower-end portion of the outer casing 156' is reduced slightly in external diameter and is equipped with a circumjacent shell 158' that defines an annular chamber or constant pressure space 168' therewithin. The sleeve or shell 158' may be adhesively bonded or otherwise secured to the casing 156' so as to form a fluid-tight connection therewith and the shell is preferably formed of a strong, light-weight material such as one of the commercially available synthetic, thermo-setting, resin-plastic fibre-glass compositions.

Positioned within the outer casing 156' is an inner vibratory percussive tool structure 120' that may be a conventional pneumatically-energized paving breaker as hereinbefore described. The inner tool structure 120' is supported within the outer casing for longitudinal displacements or vibratory movements with respect thereto, and is guided for such movements on bearing surfaces 161' and $161^{a'}$ that slidably and sealingly engage the inner surface of the longitudinally extending cylinder defined within the outer casing. Such longitudinal displacements of the inner tool structure are limited in each longitudinal direction by stop structure having cooperative elements respectively provided by the inner tool structure and outer casing, and in particular, such movement is limited in one direction by abutment of the elements $162^{a'}$ and $164^{a'}$ which are respectively provided by the inner tool structure and outer casing, and is limited in the opposite direction by abutment of the elements 162b′ and 164b′ which are respectively provided by the inner tool structure and outer casing. Desirably, metal-to-metal contact is avoided during any such abutments by making the elements 164a′ and 164b′ resilient, as shown.

The inner percussive tool structure has a restricted portion intermediate the bearings 161′ and 161a′ that defines with the circumjacent surface of the outer casing an annular space 184′ through which actuating fluid is supplied to the inner percussive tool structure through inlet ports 121′ that communicate with such space. Actuating fluid is delivered to the space 184′ through an inlet coupling 182′ adapted to be connected to a source of actuating fluid. The flow of such fluid from the inlet coupling and into the space 184′ is controlled by a valve 176′ which is manipulated by a control lever 148′ through a valve rod or stem 146′. In the position shown in FIGURE 23, the lever 148′ has been depressed to open the valve and when the lever is released, the stem 146′ will be displaced upwardly by the biasing force of the coil spring which seats thereagainst to close the valve.

The inner percussive tool structure 120′ is exhausted to atmosphere through ports 122′, located in the lower-end portion of the bearing 161a′, which communicate with a circumjacent annular space maintained at atmospheric pressure through one or more openings in the outer casing 156′ that communicate therewith. The lower-end portion 154′ of the inner percussive tool structure has a further reduced diameter that defines a stem or rod 153′ that is slidably and sealingly received within a surrounding transverse partition provided therefore by the outer casing. Disposed below such partition is a cylinder 174′ that communicates through a passage or opening 172′ with the constant pressure space 168′. Slidable within the cylinder 174′ is a piston 152′ that is carried by the lower-end portion 154′ of the inner tool. The piston, in being constrained on the inner tool structure for reciprocatory movement therewith, is adapted to traverse an exhaust outlet 134′ that is defined by a plurality of ports or apertures arranged in longitudinally spaced relation. Such an arrangement is advantageous for reasons that will be set forth in greater detail hereinafter.

Pressure fluid is continuously supplied to the constant pressure space 168′ through a restricted inlet orifice 134a′ that communicates with a supply passage 186′ connected to the inlet coupling 182′ upstream of the valve 176′. Such pressure fluid enters the cylinder 174′ from the constant pressure space 168′ through the opening 172′, and defines a force-transmitting linkage operable between the upwardly-facing surface 134c′ of the piston 152′ and the downwardly-facing upper-end closure of the cylinder 174′ defined by the aforementioned partition.

This 2-casing percussive tool structure shown in FIGURE 23 operates in the same manner as the tool shown in FIGURE 11, and for this reason it is not necessary to repeat a detailed description of such operation. For convenience it simply may be noted that the pneumatic force developed between the downwardly-facing surface of the upper-end closure of the cylinder 174′ and the upwardly-facing surface 134c′ of the piston 152′, supports the outer casing 156′ and is operative to transmit feeding force or manual down-push from the outer casing to the inner percussive tool structure 120′. If the magnitude of such feeding force is increased suddenly above some existing value, the downward displacement tending to be enforced upon the outer casing thereby will cause the outlet 134b′ to be further closed by the piston 152′ with the result that the force transmitted by the pneumatic column will be regulatively increased to return the outer casing to its former position with respect to the inner percussive tool.

Similarly, if the magnitude of such feeding force is suddenly decreased from some existing value, the outer casing will tend to move upwardly, the outlet 134b′ will be uncovered to a greater extent by the piston 152′, the escape of fluid from the cylinder 174′ will increase, and the consequent regulative reduction in the value of the pneumatic force operative between the upper-end closure of the cylinder 174′ and the surface 134c′ of the piston will permit the outer casing to move downwardly and return to its prior position with respect to the inner percussive tool structure.

Additionally the composite volume provided by the constant pressure space 168′, opening 172′ and that portion of the cylinder 174′ in communication therewith at any time is sufficiently large with respect to the cyclic displacements of the piston 152′ to maintain the value of the force transmitted by the linkage substantially constant during any vibratory displacement of the inner tool structure so as not to transmit such vibratory displacements to the outer casing 156′, as heretofore described. In this same connection it will be noted that the force defined by the force-transmitting linkage is substantially the only force operative upon the inner percussive tool structure 120′ that is susceptible of variation since the upper-end portion of the inner tool structure is maintained at atmospheric pressure through appropriate openings 167′ in the upper end of the outer casing, and the lower end of the inner tool structure is also maintained at atmospheric pressure since it extends outwardly from and below the lower extremity of the outer casing 156′.

The outer casing 156′ radially encloses the inner percussive tool structure 120′ but does not completely enclose the same axially since the lower-end portion of the inner percussive tool extends outwardly beyond the outer casing 156′. Thus the degree of encapsulation of the inner tool structure differs slightly from that shown in FIGURE 11 wherein the outer casing completely encloses the inner percussive tool structure both radially and axially. It should be appreciated however that the same degree of encapsulation can be provided should this be desired.

Referring again to the exhaust outlet 134b′, it has been found that a single exhaust outlet, such as the outlet 134b shown in FIGURE 11, or a ring of angularly spaced outlets all lying in a single transverse plane extending through the control cylinder, sometimes results in a hunting action or slight undulation of the outer casing which is caused by a tendency of the automatic control system to overcorrect for force variations that attempt to disturb the outer casing. Such hunting action of the control system can be effectively damped or attenuated by providing an exhaust outlet which comprises a plurality of ports or openings spaced from each other along the longitudinal or vibratory axis of the inner percussive tool structure, as shown in FIGURE 23.

It should be appreciated that such ports are not necessarily spaced from each other by equal axial distances, and three such ports, as shown in FIGURE 23, are not necessarily a requisite number. Further, each of the ports shown in FIGURE 23 may be representative of a plurality of longitudinally spaced rings of ports, each ring defining a transverse plane extending through the control cylinder and comprising a plurality of ports spaced angularly thereabout. Furthermore, any such plurality of ports need not be oriented in precise, longitudinally-spaced rings and need not have exactly the same cross-sectional areas. In other words, any porting arrangement may be employed which will provide the desired attenuation or damping of the corrective response of the feedback control so long as the arrangement includes openings which are disposed in spaced relation along the axis of vibration of the inner tool structure, or includes one or more openings elongated axially along such axis.

The desirable attenuation attained by any such arrangement results from the conversion of the corrective action of the feedback control system from what is essentially a step function to a continuous or semicontinuous function. More pointedly, with a single outlet port, as shown in FIGURE 11, or a single ring of ports, the corrective action of the control system is sometimes responsive, for example, to movement of the control piston 152 from a position in which the outlet 134<sup>b</sup> is completely open to one in which it is completely closed (or vice versa); and the resultant momentum then imparted to the piston 152 and inner tool structure may be slightly in excess of that required for proper correction and tends to carry the tool structure beyond the proper location for correcting repositioning thereof which, then, may cause the same type of action to occur in the reverse direction. Thus, hunting may result from the step function of the corrective action.

However, with the improved outlet arrangement described, the effective fluid-escape area of the exhaust outlet upon movement of the control piston 152' is progressively or more gradually changed; and the corrective action of the control system, in being responsive thereto, is a continuous or semi-continuous step function and the resultant attenuation or damping of the control response obviates the undesirable hunting action.

One of the difficulties that arises quite frequently in the use of percussive paving breakers is that the spike or work member thereof becomes frictionally gripped by the concrete mass that is penetrated thereby, and the magnitude of this frictional grip is often such that it is difficult and sometimes impossible to extract the spike therefrom by employment of customary extraction techniques in conjunction with the usual paving breaker. More particularly, in the conventional paving breaker, the effort to extract a stuck spike from the frictional grip of such penetrated concrete mass consists of manually lifting the tool relative to the spike thereof to bring a spike-retaining element provided by the tool casing into abutment with a laterally extending retaining flange provided by the spike. The tool is then actuated and the resulting vibratory movements of the tool casing cause an upwardly-directed impact force to be delivered to the spike flange by the casing retaining element during each upward vibratory displacement of the tool casing. Most often the magnitude of such upwardly-directed blows is not sufficiently great to extract the stuck spike and it must be loosened from the surrounding concrete mass by further demolishing the same with another spike. Additionally, the vibratory displacements of the tool casing are imparted directly to the workman who, at such time, is supporting the entire tool with a lifting force in the order of 100 pounds; and the effects of the vibration thereby imparted to the workman are quite fatiguing and may be injurious if excessively prolonged.

Prior attacks on the problem of spike extraction have been made, such as the one disclosed in Leavell Patent No. 2,752,889, in which the vibratory displacements of the tool casing are employed in an improved manner to effect spike extraction. The 2-casing percussive tool illustrated in FIGURE 23 has a somewhat conventional system for extracting the spike or work member from the frictional grip of a concrete mass penetrated thereby in that the workman must elevate the outer casing 156' by lifting upwardly against the handles T' thereof which brings the abutment elements 162<sup>b</sup>' and 164<sup>b</sup>' into engagement and elevates the inner percussive tool structure 120' until the laterally extending annular flange 190' of the spike 191' is abutted by the impact element 192', which in this tool, is in the form of a plug secured by buttress threads to the lower-end portion 154' of the inner percussive tool structure. Thereafter, the tool is energized by depressing the valve lever 148' and the resulting vibratory movement of the inner percussive tool structure 120' causes upwardly-directed impact forces to be repetitively applied to the flange 190'.

The spike-extraction or pull-out operation is quite effective because the vibration or vibratory displacements of the percussive tool 120' are quite violent and of relatively large magnitude for the reason mentioned hereinbefore and also because of the sharp character of each blow resulting from the uncushioned, direct metal-to-metal impact of the element 192' with the flange 190'. However, the outer casing 156' does not remain vibrationless during such pull-out operation.

The embodiment of the 2-casing percussive tool illustrated in FIGURE 24 obviates this disadvantage in that the outer casing thereof remains vibrationless, not only during demolition operation but also during spike-extraction or pull-out operation. This result is accomplished through a force-transmitting linkage that operates in two directions; namely, in opposite axial or longitudinal directions relative to the reciprocatory axis of the inner percussive tool structure in contrast to the force-transmitting linkages heretofore described which are effective to transmit force in only one such direction.

With this exception the tools shown in FIGURES 23 and 24 are substantially identical, and for convenience, the same numerals are used to identify respectively corresponding elements except that each number has been double primed in FIGURE 24 for purposes of differentiation. Thus the tool illustrated in FIGURE 24 has an outer casing 156″ equipped at its upper end with handles T″ that may be provided with resilient hand grips, as shown. The lower-end portion of the outer casing 156″ is reduced slightly in external diameter and is equipped with a circumjacent shell 158″ that may be adhesively bonded or otherwise secured to the casing 156″ so as to form a fluid-tight connection therewith. The shell is preferably formed from a strong, light-weight material such as one of the commercially available synthetic, thermo-setting, resin-plastic fibre-glass compositions.

Positioned within the outer casing 156″ is an inner vibratory percussive tool structure 120″ that may be a conventional pneumatically-energized paving breaker, as hereinbefore described. The inner tool structure 120″ is supported within the outer casing for longitudinal displacements or vibratory movements with respect thereto, and is guided for such movements on bearing surfaces 161″ and 161<sup>a</sup>″ that slidably and sealingly engage the inner surface of the longitudinally extending cylinder defined within the outer casing. Such longitudinal displacements of the inner tool structure are limited in each longitudinal direction by stop structure having cooperative elements respectively provided by the inner tool structure and outer casing, and in particular, such movement is limited in one direction by abutment of the elements 162<sup>a</sup>″ and 164<sup>a</sup>″ which are respectively provided by the inner tool structure and outer casing, and is limited in the opposite direction by abutment of the elements 162<sup>b</sup>″ and 164″ which are respectively provided by the inner tool structure and outer casing. Desirably, metal-to-metal contact is avoided during any such abutments by making the elements 164<sup>a</sup>″ and 164<sup>b</sup>″ resilient, as shown.

The inner percussive tool structure has a restricted portion intermediate the bearings 161″ and 161<sup>a</sup>″ that defines with the circumjacent surface of the outer casing an annular space 184″ through which actuating fluid is supplied to the inner percussive tool structure through inlet ports 121″ that communicate with such space. Actuating fluid is delivered to the space 184″ through an inlet coupling 182″ adapted to be connected to a source of actuating fluid. The flow of such fluid from the inlet coupling and into the space 184″ is controlled by a valve 176″ which is manipulated by a control lever 148″ through a valve rod or stem 146″. In the position shown in FIGURE 24, the lever 148″ has been depressed to open the valve and when the lever is released, the stem 146″ will be displaced upwardly by the biasing force of a coil spring which seats thereagainst to close the valve.

The inner percussive tool structure 120″ is exhausted to atmosphere through ports 122″ located in the lower-end portion of the tool which communicate with a circumjacent annular space maintained at asmospheric pressure through one or more openings in the outer casing 156″ that communicate therewith. The lower-end portion 154″ of the inner percussive tool structure has a further reduced diameter that defines a stem or rod 153″ that is slidably and sealingly received within a surrounding transverse partition provided therefor by the outer casing.

Disposed below such partition, which defines the upper-end closure therefor, is a cylinder $174^{a1''}$ that communicates through a passage or opening $172^{a1''}$ with a constant pressure space $168^{a1''}$ that is in the form of an annular chamber defined within the shell 158″. Sealingly slidable within the cylinder $174^{a1''}$ is a piston $152^{a1''}$ that is carried by the lower-end portion 154″ of the inner tool structure. The piston, in being constrained on the inner tool structure for reciprocatory movement therewith, is adapted to transverse an exhaust outlet $134^{b1''}$ that communicates with the cylinder $174^{a1''}$. The outlet $134^{b1''}$ is defined by a plurality of ports or apertures arranged in longitudinally spaced relation for reasons of attenuation, as heretofore described.

Pressure fluid is continuously supplied to the constant pressure space $168^{a1''}$ through a restricted inlet orifice $134^{a1''}$ that communicates through a tube or conduit $186^{b''}$ with a manifold chamber $186^{a''}$ which communicates through a supply passage 186″, with the inlet coupling 182″ upstream of the valve 176″. Pressure fluid enters the cylinder $174^{a1''}$ through the opening $172^{a1''}$ and defines a force-transmitting linkage operable between the upwardly-facing surface $134^{c1''}$ of the piston $152^{a1''}$ and the downwardly-facing upper-end closure of the cylinder $174^{a1''}$.

The total force-transmitting linkage also includes a cylinder $174^{a2''}$ that communicates through a passage or opening $172^{a''}$ with a constant pressure space $168^{a2''}$ defined within the outer shell 158″. Sealingly slidable within the cylinder $174^{a2''}$ is a piston $152^{a2''}$ that is carried by the inner tool 120″ adjacent the bearing $161^{a''}$. The piston $152^{a2''}$, in being constrained on the inner tool structure for reciprocatory movement therewith, is adapted to traverse an exhaust outlet $134^{b2''}$ that communicates with the cylinder $174^{a2''}$. The outlet $134^{b2''}$ is defined by a plurality of ports or apertures arranged in longitudinally spaced relation for reasons of attenuation, as heretofore described.

Pressure fluid is continuously supplied to the constant pressure space $168^{a2''}$ through a restricted inlet orifice $134^{a2''}$ that communicates with the supply manifold $186^{a''}$. Pressure fluid enters the cylinder $174^{a2''}$ through the opening $172^{a2''}$ and defines a force-transmitting linkage operable between the downwardly-facing surface $134^{c2''}$ of the piston $152^{a2''}$ and the upwardly-facing lower-end closure of the cylinder $174^{a2''}$.

As in the case of the tool shown in FIGURE 23 the outer casing 156″ radially encloses the inner percussive tool structure 120″ but does not completely enclose the same axially since the lower-end portion of the inner tool structure extends outwardly beyond the outer casing 156″. Thus, the lower end of the inner tool structure is maintained at atmospheric pressure, and the upper end-portion thereof is also maintained at atmospheric pressure through appropriate openings 167″ in the upper end of the outer casing. The inner percussive tool is also equipped with a spike or work member 191″ having an annular retaining flange 190″ that is adapted to be engaged by an element 192″ secured by buttress threads to the lower-end portion 154″ of the inner tool structure.

The 2-casing percussive tool shown in FIGURES 24, 25 and 26 operates in substantially the same manner, during demolition operation, as the tool structures heretofore described. However, the composite force-transmitting linkage defines a force couple between the outer casing and the inner tool structure comprised of two individual force components that combine to define a net force-connection between the outer casing and inner percussive tool structure.

In further explanation and considering initially the relative position of the outer casing and inner tool structure as illustrated in FIGURE 25a, the tool in such condition has the control valve 176″ thereof closed, operating fluid is being supplied to the tool through the coupling 182″, and the work member 191″ has its point supported upon or imbedded in an underlying concrete slab. The outer casing 156″ has a particular relation with the inner tool structure 120″ which is the result of and is determined by the magnitude and effective direction of the net pressure force being transmitted therebetween by the force-transmitting linkage.

Such transmitted force results in the folowing way: Operating fluid is supplied to the manifold chamber $186^{a''}$ which is maintained at substantially line pressure. Pressure fluid is supplied therefrom at reduced pressure to the constant pressure spaces $168^{a1''}$ and $168^{a2''}$ through the respectively associated inlet orifices $134^{a1''}$ and $134^{a2''}$; and consequently, the cylinder $174^{a1''}$ is being supplied with operating fluid from the constant pressure space $168^{a1''}$ by its connection thereto through the port $172^{a1''}$, and the cylinder $174^{a2''}$ is being supplied with operating fluid from the constant pressure space $168^{a2''}$ by its connection therewith through the port $172^{a2''}$. Therefore, the pressure force developed within the cylinder $174^{a1''}$ is operative between the downwardly-facing upper-end closure thereof and the upwardly-facing surface $134^{c1''}$ of the piston $152^{a1''}$ and tends to urge the outer casing 156″ upwardly, downward movement of the inner tool structure 120″ being prevented by its rigid engagement with the flange 190″ of the work member 191″ which is supported by the underlying concrete slab. Similarly, the pressure force developed within the cylinder $174^{a2''}$ is operative between the upwardly-facing lower-end closure thereof and the downwardly-facing surface $134^{c2''}$ of the piston $152^{a2''}$ and tends to urge the outer casing 156″ downwardly.

In the specific illustration of FIGURE 25a, the only feeding force urging the outer casing 156″ downwardly is assumed to be the weight thereof which is indicated by the single arrow pointed downwardly toward the upper end of the outer casing, and the algebraic sum of the two pressure forces acting oppositely on the outer casing is substantially equal and opposite in direction to the casing weight. Therefore, the value of the force developed within the cylinder $174^{a1''}$ must be and is substantially superior to the value of the force developed within the cylinder $174^{a2''}$, and the resultant or algebraic sum of these force components is such that the outer casing and inner tool structure are oriented in the illustrated condition of impact-preventing intermediacy.

Inspection of FIGURE 25a makes clear the reason that the force developed within the cylinder $174^{a1''}$ is superior in value to the force developed within the cylinder $174^{a2''}$. It will be noted in this figure that the exhaust outlet $134^{b1''}$ is substantially closed and will remain closed so long as the outer casing 156″ is in the position illustrated or is in a lower position relative to the inner tool structure 120″. Such configuration permits the pressure in the cylinder $174^{a1''}$ to increase to a value sufficient to lift the outer casing into and maintain it in the position shown. At the same time the exhaust outlet $134^{b2''}$ is partially open, and will be opened to a greater extent whenever the outer casing 156″ is in a lower position relative to the inner tool structure 120″ than that illustrated, thereby permitting a continuous escape of pressure fluid from the cylinder $174^{a2''}$, as indicated by the single exhaust arrow shown in this figure.

If the external feeding force or manual down-push applied to the outer casing 156″ is suddenly increased, as indicated by the additional downwardly-pointing arrows in FIGURE 25b, the outer casing will be displaced downwardly a distance that is directly related to the amount by which the value of the feeding force is increased.

Thus, the exhaust outlet 134$^{b1''}$ may be completely closed and the exhaust outlet 134$^{b2''}$ opened to a greater extent by such displacement, thereby permitting an even greater escape of fluid from the cylinder 174$^{a2''}$, as indicated by the two exhaust arrows in FIGURE 25b. Therefore, the pressure force within the cylinder 174$^{a1''}$ will increase while the pressure force present in the cylinder 174$^{a2''}$ decreases; and the net effect will be to increase the value of the upwardly-directed net pressure force operative against the outer casing 156'', thereby tending to restore it to the position shown in FIGURE 25a.

When, as shown in FIGURES 25c and 25d, the valve 176'' is opened to initiate demolition operation of the tool and, at substantially the same time the magnitude of the externally applied feeding force is further increased, the outer casing 156'' will remain in the position shown in FIGURE 25b and the vibratory movements or axially displacements of the inner percussive tool structure 120'' will not be transmitted to the outer casing 156'' because of the volumetric relationship of the constant pressure spaces 168$^{a1''}$ and 168$^{a2''}$, and their respectively associated cylinders 174$^{a1''}$ and 174$^{a2''}$, for the reasons set out in detail hereinbefore.

Therefore, during periods of demolition operation, the outer casing 156'' and inner vibratory percussive tool structure 120'' are connected by a force-transmitting linkage incapable of transmitting vibration from the inner tool structure to the outer casing but quite capable of transmitting a feeding force therebetween. Additionally, the value of the force transmitted by the linkage is automatically adjusted by appropriate changes in the value of the individual force components operative within the cylinders 174$^{a1''}$ and 174$^{a2''}$ to accommodate changes in the value of the feeding force and thereby provide a force-invariable positional stability for the tool, and to maintain the outer casing and inner percussive tool structure in a condition of impact-preventing intermediacy, all as described in detail hereinbefore with particular reference to the 2-casing tool embodiment illustrated in FIGURE 11.

The operational characteristics of the 2-casing percussive tool shown in FIGURE 24 during spike-extraction or pull-out operation thereof are illustrated in FIGURES 26a through 26d. FIGURE 26a depicts the same initial conditions shown in FIGURE 25a, which have been described previously. In FIGURE 26b, a lifting force (upwardly-directed feeding force) of sufficient magnitude has been applied by the workman to the outer casing 156'', as indicated by the addition of upwardly-directed arrows to the upper end of the outer casing, to elevate the same which necessarily raises the inner percussive tool structure until the element 192'' thereof abuts the retaining flange 190'' of the work member 191''. Quite evidently, the value of such lifting force must be large enough to overcome the composite weight of the outer casing and inner percussive tool structure except for the weight of the work member 191'' thereof.

Such upward movement of the outer casing tends to displace the same upwardly relative to the inner tool structure because the value of the net pressure force acting upwardly against the outer casing is no longer opposed by the weight thereof. This displacement of the outer casing closes the exhaust outlet 134$^{b2''}$ and opens the exhaust outlet 134$^{b1''}$ to an even greater extent; and, as a result, the pressure force within the cylinder 174$^{a1''}$ decreases in value while the pressure force within the cylinder 174$^{a2''}$ increases in value so that the then present, resultant net force is attempting to restore the outer casing to its prior position with respect to the inner tool structure. This condition is indicated in FIGURE 26b by the omission of the exhaust arrow at the port 134$^{b2''}$ and the addition of the exhaust arrows at the port 134$^{b1''}$.

FIGURES 26c and 26d illustrate pull-out operation of the tool, and in these figures the valve 176'' has been opened to supply operating fluid to the inner percussive tool structure 120''. With operating fluid being supplied thereto, the inner percussive tool structure vibrates relative to the outer casing and also relative to the spike or work member 191'' which, at such time, is rigidly constrained by the frictional grip of a concrete mass penetrated thereby.

In FIGURE 26c the inner percussive tool structure has vibrated downwardly relative to both the work member and outer casing; and at the same time, the outer casing has moved downwardly from the position thereof shown in FIGURE 26b because the magnitude of the workman's lifting force has remained the same and the corrective action of the feedback control means is attempting to return the outer casing to its prior or usual position with respect to the inner percussive tool (shown in FIGURE 26a). This corrective adjustment in the value of the force transmitted by the linkage means is accomplished by an increase in the value of the pressure-force component within the cylinder 174$^{a2''}$ which is accompanied by a simultaneous decrease in the value of the pressure-force component within the cylinder 174$^{a1''}$.

In FIGURE 26d the inner percussive tool structure has vibrated upwardly relative to both the work member and outer casing, and such upward vibratory displacement of the inner tool structure has been suddenly arrested by impact engagement of the element 192'' thereof with the work member flange 190''. Such impact abutments of the element 192'' against the flange 190'' occur repetitively and at the operating frequency of the inner percussive tool structure (for example 1200 cycles per minute in certain tools) and the relatively large impact forces thereby transmitted to the spike tend to withdraw the same from the frictional grip of the concrete mass in which it is imbedded. The value of these repetitive impact forces is quite large for the reasons discussed with reference to the tool shown in FIGURE 23.

By comparing FIGURES 26c and 26d it will be apparent that the force-transmitting linkage is effective to transmit the upwardly-directed feeding force from the outer casing to the inner percussive tool structure during pull-out operation without transmitting vibration therebetween because, in each figure, the outer casing is shown to be in the same position. The reasons therefore have been discussed in detail hereinbefore in connection with the demolition operation of 2-casing tools and involve the constancy of the force transmitted between the inner tool structure and outer casing.

It will be appreciated from the foregoing discussion that the force-transmitting linkage illustrated and described in connection with the 2-casing percussive tool shown in FIGURES 24 through 26 is operative to transmit force between a member in which the occurrence of vibration is necessary or unavoidable (the inner percussive tool structure) and a member in which the occurrence of vibration is undesirable (the outer casing) and to transmit such force from one member to the other selectively in either of the two axial directions along the vibratory axis of the unavoidably vibrating member. Thus, such linkage differs from those described in connection with the prior discussed 2-casing tools in which the linkage means thereof are capable of transmitting only unidirectional force, that is, from one member to the other in only one axial direction along the vibratory axis of the unavoidably vibrating body.

However, all of the linkage means are effective to transmit such force without transmitting vibration between the two members; and additionally, to function so that the force transmitted thereby is automatically adjusted to accommodate and compensate for changes in the value of the feeding force or manual down-push applied to the outer casing, and to compensate for changes in the loading force applied to the inner tool structure which tend to shift the mean position of the range of the vibratory movements thereof, so as to continuously

I claim:

1. In combination with apparatus having a vibratory element and an element in which the occurrence of vibration is undesirable, connecting linkage for effectuating a necessary transmission of force from one to the other of said elements selectively in either of two directions, means for automatically adjusting the value of such transmitted force to maintain a predetermined relation between the vibratory and second mentioned elements, means for maintaining any such adjusted value relatively constant throughout any cycle of the vibratory motion of said vibratory element, and means for determining the direction of the force transmitted from such one to the other of said elements.

2. In combination with apparatus having a vibratory element and a second element in which the occurrence of vibration is objectionable, connecting linkage for effectuating a necessary transmission of force from one to the other of said elements selectively in either of two opposite directions, means for restricting the value of such force communicable through said linkage to a relatively constant value throughout any cycle of the vibratory motion of said vibratory element, feedback means for regulatively altering such constant value to maintain a predetermined operational relation between the aforesaid two elements, and means for determining the direction of the force transmitted from such one to the other of said elements.

3. In combination with apparatus having a vibratory element and an element in which the occurance of vibration is undesirable, connecting linkage for effectuating a necessary transmission of force therebetween and comprising a pair of linkages respectively operative between said elements and transmitting components comprising said force in opposite directions in their respective application to each of said elements, means for automatically adjusting the valve of such transmitted force to maintain a predetermined relation between the vibratory and second mentioned elements, means for maintaining any such adjusted value relatively constant throughout any cycle of the vibratory motion of said vibratory element, and means for changing the relative values of such force components to selectively make one or the other superior and thereby determine the direction of the force transmitted from such one to the other of said elements.

4. In combination with apparatus having a vibratory element and a second element in which the occurrence of vibration is objectionable, connecting linkage for effectuating a necessary transmission of force from one to the other of said elements selectively in either of two opposite directions and comprising a pair of linkages respectively operative between said elements and transmitting components comprising such force in the aforesaid opposite directions in their respective application to each of said elements, means for restricting the value of such force communicable through said linkage to a relatively constant value throughout any cycle of the vibratory motion of said vibratory element, feedback means for regulatively altering such constant value to maintain a predetermined operational relation between the aforesaid two elements, and means for changing the relative value of such force components to selectively make one or the other superior and thereby determine the direction of the force transmitted from such one to the other of said elements.

5. In structural combination, a pair of elements related for variable-stroke relative reciprocatory movement along a predetermined axis and adapted to being loaded with a force which is subject to variations that tend to actuate said elements in such relative movement in one direction or the other along such axis, a pair of pneumatic-pressure linkages coupling said elements for the transmission of force therebetween opposing an contemporary value and direction of such loading force and respectively providing a component of such transmitted force such force components having opposite directions in their respective application to each of said elements and being maintained by said linkages at a substantially constant value during any cycle of the relative reciprocatory movement of said elements, and means for automatically adjusting the relative values of such force components as necessary to compensate for variations in and provide substantially simultaneous counterbalance for any contemporary value and direction of such loading force.

6. In vibration-elimination structure of the character described, the combination of a pair of relatively reciprocable elements consisting of a vibratory element capable of simultaneously displacing both cyclic and random reciprocations and a second element in which the the occurrence of vibration is objectionable, said elements providing two pairs of relatively reciprocable opposed surfaces oriented so that one pair thereof reciprocates toward each other as the other pair reciprocates away from each other during each vibratory displacement of said vibratory element and said elements being required to have a substantially continuous condition of impact-preventing separation therebetween during proper operation of the structure, means defining a pressurizable enclosure about one pair of said opposed surfaces and means for establishing therewithin a gaseous column extending between said one pair of opposed surfaces for transmitting a first component of force between said elements, means defining a pressurizable enclosure about the other pair of said opposed surfaces and means for establishing therewithin a gaseous column extending between said other pair of opposed surfaces for transmitting a second component of force between said elements, the volume of each of said enclosures being so related to the cyclic increases and decreases in the volumes of the respectively associated columns produced by the cyclic reciprocations of said vibratory element that substantially no change is pressure occurs within each of said enclosures because of such cyclic reciprocations of the vibratory element, and means for automatically adjusting the pressures within said enclosures in relation to the random reciprocations of said vibratory element so as to maintain the aforesaid required condition of separation between said elements, and means for selectively changing the relative values of the pressures within said enclosures to make one value or the other superior and thereby determine the direction of the algebraic sum of the aforesaid first and second components of force transmitted between said elements.

7. The apparatus of claim 6 in which said means for automatically adjusting the pressures within said enclosures comprises means for continuously supplying gas under pressure to each of said enclosures, means for premitting the escape of gas from each of said enclosures, and means for regulating the relative rates of such escape from and supply of gas to each of said enclosures so as to selectively increase or decrease the pressures therein to maintain the aforesaid condition of separation between said elements.

8. The structure of claim 6 in which said pressurizable enclosures are respectively provided with an inlet adapted to communicate with a source of gas under pressure and with an exhaust outlet, and in which said automatic means includes a pair of seal members carried by said vibratory element to respectively traverse said outlets and maintain a selectively variable control over the rates of exhaust flow therethrough.

9. In combination with a pneumatic percussive tool having a main casing element defining a cylinder containing a piston reciprocable therein by an alternate application of pneumatic pressure to the opposite ends thereof which simultaneously produces reactive vibration of the main casing element, a second casing element related to said main casing element for relative reciprocable movements generally along the axis of reciprocation of said piston, connecting linkage for effectuating a necessary transmission of force from one of said elements to the other in either direction along such axis of reciprocation, means for restricting the value of such force communicable through said linkage to a relatively constant value throughout any cycle of the vibratory reciprocation of the main casing element, feedback means for regulatively altering such constant value to maintain a predetermined operational relation between said casing elements, and means for determining the direction of the force transmitted from such one to the other of said elements.

10. In combination with a pneumatic percussive tool having a main casing element defining a cylinder containing a piston reciprocable therein by an alternate application of pneumatic pressure to the opposite ends thereof which simultaneously produces reactive vibration of said main casing element, a second casing element related to said main casing element for relative reciprocable movements generally along the axis of reciprocation of said piston, connecting linkage for effectuating a necessary transmission of force between said casing elements and comprising a pair of linkages respectively operative between said casing elements for transmitting along said axis of reciprocation components comprising said force which are opposite in direction in their respective application to each of said casing elements, means for restricting the value of such force communicable through said linkage to a relatively constant value throughout any cycle of the vibratory motion of said main casing element, feedback means regulatively altering such constant value during a sequence of such cycles to maintain a predetermined operational relation between said casing elements, and means for changing the relative values of such force components to selectively make one or the other superior and thereby determine the direction of the force transmitted from such one to the other of said casing elements.

11. In combination with a pneumatic percussive tool having a main casing element defining a cylinder containing a piston reciprocable therein by an alternate application of pneumatic pressure to the opposite ends thereof which simultaneously produces reactive vibration of the main casing element, a second casing element related to said main casing element for variable-stroke relative reciprocatory movement along the axis of reciprocation of said piston, said casing elements being adapted to being loaded with a force which is subject to variations tending to actuate said casing elements in such relative movement in one or the other direction along such axis, a pair of pneumatic-pressure linkages coupling said casing elements for the transmission of force therebetween opposing any contemporary direction of such loading force and respectively providing a component of such transmitted force, such force components being opposite in direction along such axis in their respective application to each of said casing elements and being maintained by said linkages at a substantially constant value during any cycle of reciprocatory movement of said main casing element, and means for automatically adjusting the relative values of such force components as necessary to compensate for variations in and provide substantially simultaneous counterbalance for any contemporary value of such loading force.

12. In a 2-casing percussive tool having an outer casing in which the occurrence of vibration is undesirable and an inner vibratory casing related thereto for relative reciprocation along a predetermined axis, a hammer reciprocable within said inner casing along such axis for the successive intermittent delivery of impact force to a work member, means for reciprocating said hammer by the alternate application of forces against the respective opposite ends thereof which results in respectively corresponding reaction forces being alternately developed in opposite directions against said inner casing which vibrate the same, the force tending to reciprocate said hammer in a direction away from its impact relation with such work member being in part reaction force developed against said hammer during the actual interval of impact thereof with such work member, connecting linkage operative between said inner and outer casings for effectuating a necessary transmission of force from one to the other in either of the opposite directions along such axis, means for automatically adjusting the value of such transmitted force over a number of impact cycles in accordance with changes in the average value of such impact reaction force intermittently operative against said hammer, means for maintaining any such adjusted value relatively constant throughout any cycle of the vibratory motion of said inner casing, and means for selectively determining the direction of the force transmitted from such one to the other of said casings.

13. In a 2-casing percussive tool having a casing element in which the occurrence of vibration is undesirable and a main vibratory casing related thereto for relative reciprocable movements, a hammer reciprocable within said main casing for the successive delivery of impact force to a work member, means for reciprocating said hammer by the alternate application of forces against the respective opposite ends thereof which results in respectively corresponding reaction forces being alternately developed in opposite directions on said main casing element which cyclically vibrate the same, the force tending to reciprocate said hammer in a direction away from its impact relation with such work member being in part reaction force developed against said hammer during the actual interval of impact thereof in its delivery of impact force to such work member and which is transmitted to said main casing element and tends to vibrate the same through random reciprocations, said casing elements providing two pairs of relatively reciprocable opposed surfaces oriented so that one pair thereof reciprocates toward each other as the other pair reciprocates away from each other during each vibratory displacement of said main casing element and said casing elements being required to have a substantially continuous condition of impact-preventing separation therebetween during proper operation of the percussive tool, means defining a pressurizable enclosure about one pair of said opposed surfaces and means for establishing therewithin a gaseous column extending between said one pair of opposed surfaces for transmitting a first component of such force between said casing elements, means defining a pressurizable enclosure about the other pair of said opposed surfaces and means for establishing therewithin a gaseous column extending between said other pair of opposed surfaces for transmitting a second component of such force between said casing elements, the volume of each of said enclosures being so related to the cyclic increases and decreases in the volume of the respectively associated columns produced by the cyclic reciprocations of said main casing element that substantially no change in pressure occurs within each of said enclosures because of such cyclic reciprocations of the main casing element, means for automatically adjusting the pressures within said enclosures in accordance with changes in the average value of such impact reaction force intermittently operative against said hammer so as to compensate for any such random reciprocations of said main casing element and thereby maintain the aforesaid required condition of separation between said casing elements, and means for changing the relative values of the pressures within said enclosures to selectively make one value or the other superior and thereby determine the direction of the algebraic sum of the aforesaid first and second components of force transmitted between said casing elements.

14. The apparatus of claim 13 in which said means for automatically adjusting the pressures within said enclosures comprises means for continuously supplying gas under pressure to each of said enclosures, means for permitting the escape of gas from each of said enclosures, and means for regulating the relative rates of such escape from and supply of gas to each of said enclosures so as to selectively increase or decrease the pressures therein to maintain the aforesaid required condition of separation between said elements.

15. The structure of claim 13 in which said pressurizable enclosures are respectively provided with both an inlet adapted to communicate with a source of gas under pressure and with an exhaust outlet, and in which said automatic means includes a pair of seal members carried by said vibratory element to respectively traverse said outlets and maintain a selectively variable control over the rates of exhaust flow therethrough.

16. The combination of claim 13 in which the aforesaid casing element is an outer casing concentrically receiving said mean casing element therein.

17. In combination with apparatus having a vibratory element, an element in which the occurrence of vibration is undesirable and connecting linkage for effectuating a necessary transmission of force therebetween, feedback means for automatically adjusting the value of such transmitted force to maintain a predetermined relation between the vibratory and second mentioned elements, and means for maintaining any such adjusted value relatively constant throughout any cycle of the vibratory motion of said vibratory element, said feedback means including damping means to attenuate the rate of response of said feedback means.

18. The combination of a pair of relatively reciprocable elements consisting of a vibratory element and an element in which the occurrence of vibration is undesirable and said elements providing relatively reciprocable opposed surfaces, means defining a pressurizable enclosure about said opposed surfaces and means for establishing therewithin a gaseous column extending between said opposed surfaces for effectuating a necessary transmission of force between said elements, and means for automatically adjusting the value of such transmitted force to maintain a predetermined relation between said vibratory and second mentioned elements comprising inlet means for supplying gas under pressure to said enclosure, outlet means for permitting the escape of gas from said enclosure and a seal member carried by one of said elements to traverse one of said inlet and outlet means for maintaining a selectively variable control over the relative rates of such escape from and supply of gas to said enclosure, the aforesaid one of said inlet and outlet means having provision for the flow of gas therethrough at more locations along the axis of reciprocation of said seal member than at a single location defined by a plane extending through said enclosure and being normal to such axis of reciprocation.

19. The combination of a pair of relatively reciprocable elements consisting of a vibratory element and an element in which the occurrence of vibration is undesirable and said elements providing relatively reciprocable opposed surfaces, means defining a pressurizable enclosure about said opposed surfaces and means for establishing therewithin a gaseous column extending between said opposed surfaces for effectuating a necessary transmission of force between said elements, means for restricting the value of such force to a relatively constant value throughout any cycle of the vibratory motion of said vibratory element, and means for automatically adjusting the value of such transmitted force to maintain a predetermined relation between said vibratory and second mentioned elements comprising inlet means for supplying gas under pressure to said enclosure, outlet means for permitting the escape of gas from said enclosure and a seal member carried by one of said elements to traverse one of said inlet and outlet means for maintaining a selectively variable control over the relative rates of such escape from and supply of gas to said enclosure, the aforesaid one of said inlet and outlet means having provision for the flow of gas therethrough at more locations along the axis of reciprocation of said seal member than at a single location defined by a plane extending through said enclosure and being normal to such axis of reciprocation.

20. The combination of claim 19 in which said feedback means comprises means for automatically varying the pressure in said gaseous medium.

21. In combination with a pneumatic percussive tool having a main casing element defining a cylinder containing a piston reciprocable therein by an alternate application of pneumatic pressure to the opposite ends thereof which simultaneously produces reactive vibration of the main casing element, a second casing element related to said main casing element for relative reciprocable movements generally along the axis of reciprocation of said piston, said casing elements being required to have a substantially continuous condition of impact-preventing separation therebetween during proper operation of the tool structure and providing relatively reciprocable opposed surfaces, means defining a pressurizable enclosure about said opposed surfaces and means for establishing therewithin a gaseous column extending between said opposed surfaces for effectuating a necessary transmission of force between said casing elements, means for maintaining the value of such force relatively constant throughout any cycle of the vibratory motion of said main casing element, and feedback means for regulatively altering such constant value during a sequence of such cycles to maintain such condition of impact-preventing separation between said casing elements and comprising inlet means for supplying gas under pressure to said enclosure, outlet means for permitting the escape of gas from said enclosure and a seal member carried by one of said casing elements to traverse one of said inlet and outlet means for maintaining a selectively variable control over the relative rates of such escape from a supply of gas to said enclosure, the aforesaid one of said inlet and outlet means having provision for the flow of gas therethrough at more locations along the axis of reciprocation of said seal member than at a single location defined by a plane extending through said enclosure and being normal to such axis of reciprocation.

22. The combination of claim 21 in which said feedback means comprises means for automatically varying the pressure in said gaseous medium.

23. The combination of claim 22 in which gas is continuously supplied through said inlet means, and in which the aforesaid one of said inlet and outlet means comprises the outlet means.

24. The combination of claim 22 in which said pressurizable enclosure includes a cylinder, and in which said seal member is a piston reciprocable therein.

25. In a 2-casing percussive tool having a casing element in which the occurrence of vibration is undesirable and a main vibratory casing element related thereto for relative reciprocable movements, a hammer reciprocable within said main casing for the successive intermittent delivery of impact force to a work member, means for reciprocating said hammer by the alternate application of pressure forces against the respective opposite ends thereof which results in respectively corresponding reaction forces being alternately developed in opposite directions against said main casing element which cyclically vibrate the same, said casing elements providing two pairs of relatively reciprocable opposed surfaces oriented so that one pair thereof reciprocates toward each other as the other pair reciprocates away from each other during each vibratory displacement of said main casing element and said elements being required to have a substantially continuous condition of impact-preventing separation therebetween during proper operation of the percussive tool, means defining a pressurizable enclosure about one pair of said opposed surfaces and means for establishing therewithin a gaseous column extending between said one pair of opposed surfaces for transmitting a first component of force between said casing elements, means defining a pressurizable enclosure about the other pair of said opposed surfaces and means for establishing therewithin a gaseous column extending between said other pair of opposed surfaces for transmitting a second component of force between said casing elements, the volume of each of said enclosures being so related to the cyclic increases and decreases in the volumes of the respectively associated columns produced by the cyclic reciprocations of said main casing element that substantially no change in pressure occurs within each of said enclosures because of such cyclic reciprocations of the main casing element, means for selectively changing the relative values of the pressures within said enclosures to make one value or the other superior and thereby determine the direction of the algebraic sum of the aforesaid first and second components of force transmitted between said casing elements, and means for automatically adjusting the pressures within said enclosure during a sequence of such cycles to maintain the aforesaid required condition of separation between said casing elements comprising a pair of inlet means respectively associated with said enclosures for supplying gas under pressure thereto, a pair of outlet means respectively associated with said enclosures for permitting the escape of gas therefrom, and a pair of seal members carried by said inner casing element for respectively traversing one of said inlet and outlet means of each enclosure for regulating the relative rates of such escape from and supply of gas to each of said enclosures.

26. In combination with a pneumatic percussive tool having a main casing defining a cylinder containing a piston reciprocable therein by an alternate application of pneumatic pressure to the opposite ends thereof which simultaneously produces reactive vibration of said main casing, a casing element related to said main casing for relative reciprocable movements generally along the axis of reciprocation of said piston, connecting linkage for effectuating a necessary transmission of force between said main casing and casing element along the axis of reciprocation of said piston, means for restricting the value of such force communicable through said linkage to a relatively constant value, and feedback means for regulatively altering such constant value to maintain a predetermined operational relation between said casing element and main casing.

27. The combination of claim 26 in which said casing element is an outer casing concentrically receiving said main casing therein.

28. The combination of claim 27 in which said casing element substantially encloses said main casing in radial directions.

29. The combination of claim 28 in which said casing element also substantially encloses said main casing axially, whereby said main casing is substantially encapsulated by said casing element.

30. In a 2-casing percussive tool having a casing element in which the occurrence of vibration is undesirable and a main vibratory casing related thereto for relative reciprocable movements, a hammer reciprocable within said main casing for the successive intermittent delivery of impact force to a work member, means for reciprocating said hammer by the alternate application of forces against the respective opposite ends thereof which results in respectively corresponding reaction forces being alternately developed in opposite directions on said main casing which vibrate the same, the force tending to reciprocate said hammer in a direction away from its impact relation with such work member being in part reaction force developed against said hammer during the actual interval of impact thereof in its delivery of impact force to such work member, means for applying to said main casing generally in the direction of motion of said hammer immediately before the delivery of impact force to such work member a substantially continuous force operative between said main casing and casing element, means for varying the value of said continuous force over a plurality of impact cycles in accordance with changes in the average value of such impact reaction force intermittently operative against said hammer, and means for maintaining the value of said continuous force substantially constant throughout any cycle of the vibrttory motion of said main casing to prevent the transmission of vibration therefrom to said casing element.

31. The percussive tool of claim 30 in which said means for reciprocating said hammer constitutes pneumatic means whereby pneumatic forces effect reciprocation of said hammer, and in which said means for applying a continuous force to said main casing constitutes pneumatic means.

32. The percussive tool of claim 30 in which said means for varying the value of said continuous force is automtically operative to vary the same and comprises a feedback system relating changes in the average value of said continuous force to displacements of said main casing caused by changes in the average value of said impact reaction force so as to increase the value of said continuous force when the main casing is displaced in one direction, and to decrease the value of said continuous force when said main casing is displaced in the opposite direction.

33. In combination with a pneumatic percussive tool having a main casing defining a cylinder containing a piston reciprocable therein by an alternate application of pneumatic pressure to the opposite ends thereof which simultaneously produces reactive vibration of said main casing, a casing element related to said main casing for relative reciprocable movements generally along the axis of reciprocation of said piston, connecting linkage for effectuating a necessary transmission of force between said main casing and casing elements along the axis of reciprocation of said piston to enable a feeding force to be transmitted from said casing element to said main casing, means for restricting the value of such force communicable through said linkage to a relatively constant value throughout any cycle of the vibratory motion of said main casing, and feedback means for regulatively altering such constant value to automatically compensate for changes in the magnitude of such feeding force to maintain a predetermined operational relation between said casing element and main casing.

34. The combination of claim 33 in which said main casing and casing element define relatively reciprocable opposed portions between which said transmitted force is operative, and in which said predetermined operational relation is one of normally continuous separation between said main casing and casing element in the direction of such relative reciprocation whereby the transmission of vibration to said casing element by stop-and-rebound action between said main casing and casing element is prevented.

35. The combination of claim 34 in which said connecting linkage utilizes a gaseous medium interposed between said opposed portions for transmitting said force therebetween.

36. In combination with apparatus having a vibratory element and a second element in which the occurrence of vibration is objectionable, connecting linkage for effectuating a necessary transmission of force from one to the other or said elements selectively in either of two opposite directions, means for restricting the value of such force communicable through said linkage to a relatively constant value throughout any cycle of the vibratory motion of said virbratory element, feedback means for regulatively altering such constant value to maintain a predetermined operational relation between the aforesaid two elements, and means for determining the direction of the force transmitted from such one to the other of said elements, said elements providing two pairs of relatively reciprocable opposed portions oriented so that one pair thereof reciprocates toward each other as the other pair reciprocates away from each other during each vibratory displacement of said vibratory element and between which such transmitted force is operative, said predetermined operational relation being one of normally continuous separation between said elements in the direction of such reciprocation whereby the transmission of vibration to said second element by stop-and-rebound action between such vibratory and second elements is prevented.

37. The combination of claim 36 in which said connecting linkage comprises a pair of linkages respectively operative between said opposed portions and each transmitting a component of such force in the aforesaid opposite directions in their respective application to each of said elements, and in which said means for determining the direction of the aforesaid transmitted force selectively makes one or the other of said linkages and its associated force component controlling.

38. The combination of claim 36 in which said connecting linkage utilizes a gaseous medium interposed between the aforesaid respectively opposed portions for transmitting such force therebetween.

39. The combination of claim 38 in which said feedback means comprises means for automatically varying the pressure in said gaseous medium.

40. In structural combination, a pair of elements related for variable-stroke relative reciprocatory movement along a predetermined axis and adapted to being loaded with a force which is subject to variations that tend to actuate said elements in such relative movement in one direction of the other along such axis, a pair of pneumatic-pressure linkages coupling said elements for the transmission of force therebetween opposing any contemporary value and direction of such loading force and respectively providing a component of such transmitted force, such force components having opposite directions in their respective application to each of said elements and being maintained by said linkages at a substantially constant value during any cycle of the relative reciprocatory movement of said elements, and means for automatically adjusting the relative values of such force components as necessary to compensate for variations in and provide substantially simultaneous counterbalance for any contemporary value and direction of such loading force, one of said elements providing a pair of abutment surfaces spaced apart in the direction of such relative movement and the other of said elements providing respectively opposed abutment surfaces therewith defining the extreme range of such movement, such substantially simultaneous counterbalance between such constant force and the loading force being normally operative to restrict such relative movement to a lesser range intermediately located within such extreme range so as to prevent the stop-and-rebound transmission of vibration-producing amounts of momentum between said elements.

41. The combination of claim 40 in which such automatic adjustment means comprises feedback means controlled by and controlling the location of said intermediate lesser range within said extreme range.

42. In combination with a pneumatic percussive tool having a main casing element defining a cylinder containing a piston reciprocable therein by an alternate application of pneumatic pressure to the opposite ends thereof which simultaneously produces reactive vibration of the main casing element, a second casing element related to said main casing element for variable-stroke relative reciprocatory movement along the axis of reciprocation of said piston, said casing elements being adapted to being loaded with a force which is subject to variations tending to actuate said casing elements in such relative movement in one or the other direction along such axis, a pair of pneumatic-pressure linkage coupling said casing elements for the transmission of force therebetween opposing any contemporary direction of such loading force and respectively providing a component of such transmitted force, such force components being opposite in direction along such axis in their respective application to each of said casing elements and being maintained by said linkages at a substantially constant value during any cycle of reciprocatory movement of said main casing element, and means for automatically adjusting the relative values of such force components as necessary to compensate for variations in and provide substantially simultaneous counterbalance for any contemporary value of such loading force, one of said elements provididng a pair of abutment surfaces spaced apart in the direction of such relative movement and the other of said elements providing respectively opposed abutment surfaces therewith defining the extreme range of such movement, such substantially simultaneous counterbalance between such constant force and the loading force being normally operative to restrict such relative movement to a lesser range intermediately located within such extreme range so as to prevent the stop-and-rebound transmission of vibration-producing amounts of momentum between said elements.

43. The combination of claim 42 in which said automatic adjustment means comprises feedback means controlled by and controlling the location of such intermediate lesser range within said extreme range.

44. The combination of a pair of relatively reciprocable elements consisting of a vibratory element and an element in which the occurrence of vibration is undesirable and said elements providing relatively reciprocable opposed surfaces, means defining a pressurizable enclosure about said opposed surfaces and means for establishing therewithin a gaseous column extending between said opposed surfaces for effectuating a necessary transmission of force between said elements, and means for automatically adjusting the value of such transmitted force to maintain a predetermined relation between said vibratory and second mentioned elements comprising inlet means for supplying gas under pressure to said enclosure, outlet means for permitting the escape of gas from said enclosure and a seal member carried by one of said elements to traverse one of said inlet and outlet means for maintaining a selectively variable control over the relative rates of such escape from and supply of gas to said enclosure, the aforesaid one of said inlet and outlet means having provision for the flow of gas therethrough at more locations along the axis of reciprocation of said seal member than at a single location defined by a plane extending through said enclosure and being normal to such axis of reciprocation, one of said inlet and outlet means including a plurality of axially spaced openings.

45. In combination with a pneumatic percussive tool having a main casing defining a cylinder containing a piston reciprocable therein by an alternate application of pneumatic pressure to the opposite ends thereof which simultaneously produces reactive vibration of said main casing, a casing element related to said main casing for relative reciprocable movements generally along the axis of reciprocation of said piston, connecting linkage for effectuating a necessary transmission of force between said main casing and casing elements along the axis of reciprocation of said piston to enable a feeding force to be transmitted from said casing element to said main casing, means for restricting the value of such force communicable through said linkage to a relatively constant value throughout any cycle of the vibratory motion of said main casing, and feedback means for regulatively altering such constant value to automatically compensate for changes in the magnitude of such feeding force to maintain a predetermined operational relation between said casing element and main casing, said main casing and casing element defining relatively reciprocable opposed portions between which said transmitted force is operative, said predetermined operational relation being one of normally continuous separation between said main casing and casing element in the direction of such relative reciprocation whereby the transmission of vibration to said casing element by stop-and-rebound action between said main casing and casing elecent is prevented, said connecting linkage utilizing a gaseous medium interposed between said opposed portions for transmitting said force therebetween, said feedback means comprising a means for automatically varying the pressure in said gaseous medium.

References Cited by the Examiner

UNITED STATES PATENTS

| | | | |
|---|---|---|---|
| 1,792,893 | 2/31 | Collins | 173—35 |
| 2,187,502 | 6/40 | Shaff | 173—137 |
| 2,400,650 | 5/46 | Leavell et al. | 173—162 |
| 2,748,750 | 6/56 | Altschuler | 173—162 |
| 2,762,341 | 9/56 | Salengro | 173—18 |
| 3,010,431 | 11/61 | Haldo | 173—162 |

BROUGHTON G. DURHAM, *Primary Examiner.*

FRED E. ENGELTHALER, *Examiner.*